US012562664B2

(12) United States Patent
Shibayama et al.

(10) Patent No.: US 12,562,664 B2
(45) Date of Patent: Feb. 24, 2026

(54) ELECTRIC MOTOR CONTROLLER

(71) Applicants: KABUSHIKI KAISHA TOSHIBA, Tokyo (JP); Carrier Japan Corporation, Tokyo (JP)

(72) Inventors: Takeshi Shibayama, Tokyo (JP); Yoshitaka Uchiyama, Fuji (JP)

(73) Assignees: KABUJSHIKI KAISHA TOSHIBA, Tokyo (JP); Carrier Japan Corporation, Tokyo (JP)

( * ) Notice: Subject to any disclaimer, the term of this patent is extended or adjusted under 35 U.S.C. 154(b) by 106 days.

(21) Appl. No.: 18/611,109

(22) Filed: Mar. 20, 2024

(65) Prior Publication Data

US 2024/0388231 A1     Nov. 21, 2024

(30) Foreign Application Priority Data

May 17, 2023     (JP) ................................. 2023-081598

(51) Int. Cl.
| | |
|---|---|
| *H02P 21/00* | (2016.01) |
| *H02M 1/00* | (2006.01) |
| *H02P 21/18* | (2016.01) |
| *H02P 21/22* | (2016.01) |
| *H02P 27/08* | (2006.01) |

(52) U.S. Cl.
CPC .......... *H02P 21/18* (2016.02); *H02M 1/0009* (2021.05); *H02P 21/22* (2016.02); *H02P 27/08* (2013.01)

(58) Field of Classification Search
CPC .. H02P 6/28; H02P 6/085; H02P 27/08; H02P 27/085; H02P 21/18; H02P 21/22
See application file for complete search history.

(56) References Cited

FOREIGN PATENT DOCUMENTS

| | | | | |
|---|---|---|---|---|
| CN | 107947667 B | * | 3/2020 | ................ H02P 6/18 |
| JP | 2015-126565 A | | 7/2015 | |

* cited by examiner

*Primary Examiner* — Karen Masih
(74) *Attorney, Agent, or Firm* — Oblon, McClelland, Maier & Neustadt, L.L.P.

(57) ABSTRACT

An electric motor controller of an embodiment includes: a PWM signal generation unit that generates three-phase PWM signal patterns to follow a magnetic pole position of the motor; a current detection unit that detects a phase current of the motor; a current change amount detection unit that outputs a difference between current values detected twice for each of two phases, as current change amounts; and a magnetic pole position estimation unit that estimates a magnetic pole position of the motor based on the current change amounts. The PWM signal generation unit uses a triangular carrier wave, generates three-phase PWM signal patterns to allow the current detection unit to detect current of each two phase twice at timing of four points within a carrier wave period of the PWM signal, shifts a maximum phase in one direction of an advancing or delay side, and oppositely shifts a medium phase.

8 Claims, 26 Drawing Sheets

COMBINATION OF CURRENT CHANGE AMOUNTS
HAVING PHASE DIFFERENCE OF 120 DEGREES

SWITCHED BY SECTOR

ELECTRIC MOTOR CONTROLLER

FIELD OF THE INVENTION

An embodiment of the present invention relates to a device for estimating a magnetic pole position of an electric motor based on each phase current of the electric motor driven by an inverter circuit.

DESCRIPTION OF THE RELATED ART

Conventionally, a magnetic pole position has been detected in order to properly control permanent magnet motors and DC brushless motors using a permanent magnet for a rotor. Detection of the magnetic pole position is to detect an electrical angle phase, which is the position on electric angular coordinates of an electric motor. To detect the magnetic pole position, a position sensor, such as a rotary encoder, a resolver, or a Hall element, can be used. However, in terms of cost and structural limitation, there are cases where providing the position sensor is difficult. For example, in the case of a compressor motor for a refrigeration cycle, installation of a position sensor is impossible because the electric motor is built into a refrigerant filling space inside the compressor that is constituted of a sealed container.

As a solution, there is a method of estimating the magnetic pole position from current and voltage information without using a position sensor. Such a method includes, for example, an induced voltage-based method and an inductance-based method. In the induced voltage-based method, induced voltage proportional to the speed of an electric motor is computed from voltage and current that are input into the electric motor, and the magnetic pole position is estimated based on the computed induced voltage. The method utilizes the fact that the induced voltage generated by rotation of the electric motor changes in accordance with an electric angle of the electric motor, which is the magnetic pole position.

The induced voltage-based method ensures sufficient accuracy in a high-speed region where the rotation speed of the electric motor is high. However, in a low-speed region where the rotation speed is low, the amplitude of the induced voltage becomes smaller or the induced voltage is not generated, which hinders accurate estimation when the electric motor is stopped or at low speeds.

Meanwhile, in the inductance-based method, the magnetic pole position is estimated by calculating the inductance of an electric motor from current and voltage information. The method utilizes the fact that the inductance of the electric motor changes at a doubled period in accordance with the electric angle of the electric motor. Several methods have been proposed as the inductance-based estimation method, in which, for example, an alternating-current voltage signal for sensing, which is not related to drive frequency, is applied to the electric motor, and the magnetic pole position is estimated from the relationship between the voltage and current.

The frequency of the alternating-current voltage signal, which is applied to determine the inductance in this way, is about several hundred Hz to several kHz that are equal to or less than a carrier frequency. This causes increased noise since the frequency of current ripples of the electric motor is within the human audible range.

In order to cope with the issue, Japanese Patent Laid-Open No. 2015-126565 proposes a method, in which duty ratio of a first phase, in three-phase PWM signal patterns, is increased or decreased in both the directions of a delay side and an advancing side with any phase of a carrier wave period as a reference, duty ratio of a second phase is increased or decreased in one direction of the delay side or the advancing side with the any phase of the carrier wave period as a reference, and duty ratio of a third phase is increased or decreased in the opposite direction of the second phase with the any phase of the carrier wave period as a reference, so that harmonic current amplitudes are generated for estimating the magnetic pole position while suppressing noise.

In the method of generating the three-phase PWM signals as described above, three-phase currents are each detected twice at the timing of fixed four points in a carrier wave period, and their differential values are calculated to obtain an estimated magnetic pole position of the electric motor based on current change amounts. Therefore, the method has an advantage of being able to obtain an estimated magnetic pole position with high accuracy without using the position sensor and being easily applicable to various electric motors even in very low speed region including zero speed, without depending on electric characteristics of the electric motor, such as a small salient ratio or a large inductance.

However, in the process of generating three-phase PWM signals, the direction in which the pulse of each phase is made to extend is changed by using carriers with different waveforms for the respective phases. For example, a V-phase carrier is a triangular wave, a U-phase carrier is a descending serrated wave, and a W-phase carrier is an ascending serrated wave opposite to the U-phase. These phases are output in such a manner that the phases where the U-phase carrier has a lowest amplitude level, the V-phase carrier has a highest amplitude level, and the W-phase carrier has a highest amplitude level coincide.

For this reason, when practical application is assumed, it is required to use a microcontroller capable of generating these carriers for respective phases. This requirements leads to necessity of updating the software of existing systems and to limitations in selection of microcontrollers during product development, which hinders broad application of the system to various systems.

DETAILED DESCRIPTION OF THE EMBODIMENT

An electric motor controller is provided which can suppress noise while ensuring a sufficient SN ratio for estimation of a magnetic pole position by using only a triangular wave for a carrier.

According to an embodiment, an electric motor controller includes: an inverter circuit that performs on/off control of a plurality of switching elements that are connected by a three-phase bridge, in accordance with predetermined PWM signal patterns, so as to drive an electric motor that converts direct current into a three-phase alternating current;

a current detection element that generates a signal corresponding to a current value of the inverter circuit;

a PWM signal generation unit that generates three-phase PWM signal patterns to follow a magnetic pole position of the electric motor;

a current detection unit that detects phase current of the electric motor based on the signal generated by the current detection element and the PWM signal patterns;

a current change amount detection unit that outputs difference between current values detected twice for each of two phases out of three phases, as current change amounts; and a magnetic pole position estimation unit that estimates a magnetic pole position of the electric motor based on the current change amounts, in which the PWM signal generation unit uses a triangular wave as a carrier wave, generates the three-phase PWM signal patterns to allow the current detection unit to detect current of each two phase twice at timing of four points within a carrier wave period of the PWM signal, and executes a first shift method, in which in the three-phase PWM signals, in magnitude relation of duty ratios of respective phases that change for each sector of output voltage from the inverter circuit, a maximum phase having a highest duty ratio is shifted in one direction of an advancing side or a delay side with any phase of the carrier wave period as a reference, and an medium phase having an medium duty ratio is shifted in a direction opposite to the maximum phase with the any phase of the carrier wave period as a reference.

First Embodiment

Figure 1:
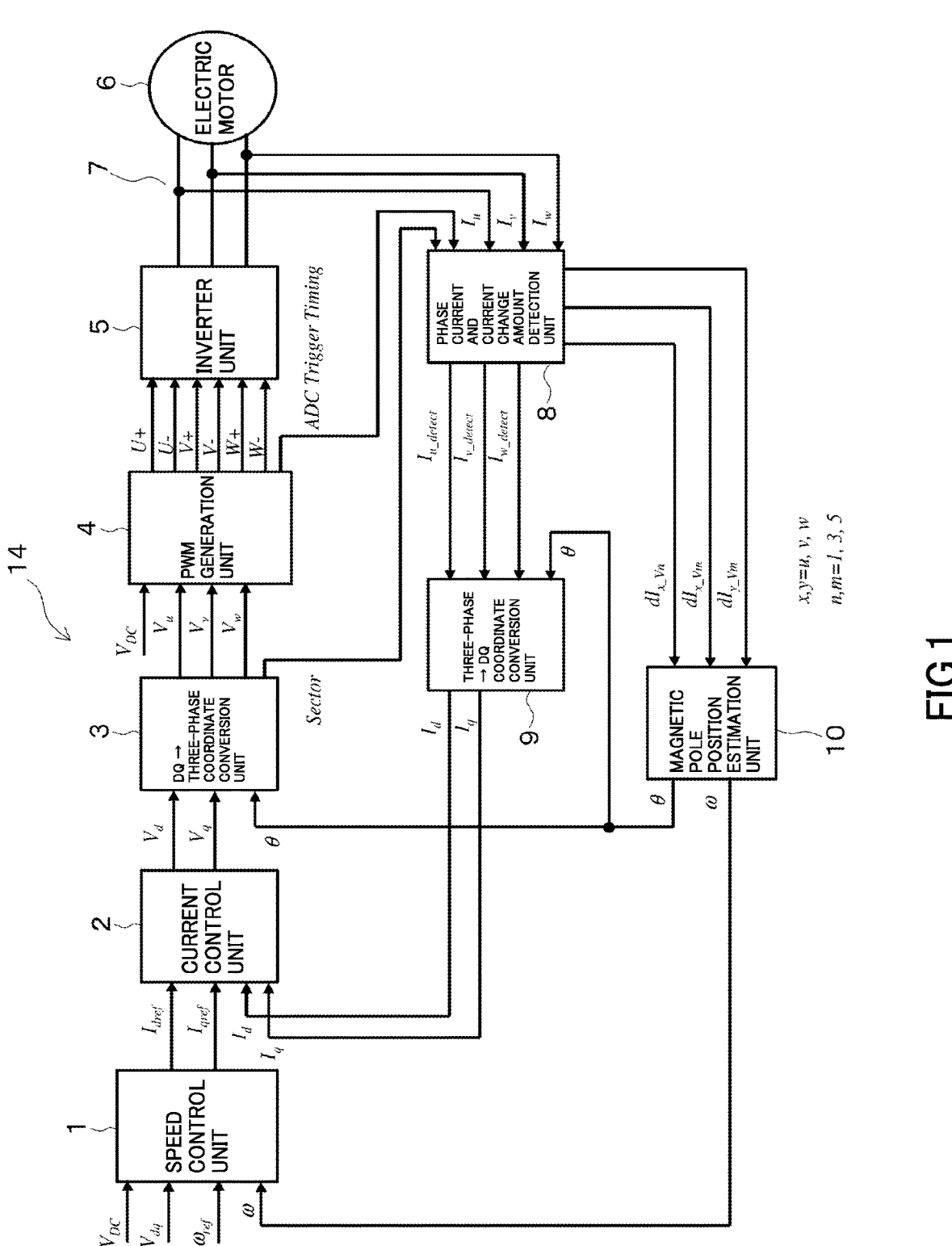
FIG. 1 is a functional block diagram showing the configuration of an electric motor controller of a first embodiment.

FIG. 1 is a functional block diagram showing the configuration of a system including an electric motor controller of the first embodiment. A speed control unit 1 performs PI control or PID control on a difference between an input speed command value ωref and an estimated speed ω obtained from a magnetic pole position estimation unit 10, to generate a q-axis current command value Iqref from an inverter unit 5 to an electric motor 6. The speed control unit 1 also performs, for example, similar PI control or the like on a difference between a direct-current voltage VDC and dq-axes voltage amplitude Vdq, to generate a d-axis current command value Idref for field weakening control.

The current control unit 2 performs PI control or PID control on a difference between the current command value Iqref and a q-axis current Iq provided from a three-phase to dq coordinate conversion unit 9 and a difference between the current command value Idref and a d-axis current Id provided from the three-phase to dq coordinate conversion unit 9, to generate a q-axis voltage command value Vq and a d-axis voltage command value Vd. Based on a magnetic pole position θ estimated by a magnetic pole position estimation unit 10, the three-phase to dq coordinate conversion unit 9 converts detection current values Iu_detect, Iv_detect, and Iw_detect, detected by a phase current and current change amount detection unit 8 through a current detector 7, into dq-axes currents Id and Iq. Based on the magnetic pole position θ, a dq to three-phase coordinate conversion unit 3 converts the d-axis voltage command value Vd and the q-axis voltage command value Vq to three-phase voltage command values Vu, Vv, and Vw. According to a principle described later, the magnetic pole position estimation unit 10 estimates the magnetic pole position θ based on three current change amounts, dIx_Vn, dIx_Vm, and dIy_Vm (x, y=u, V, w:n, m=1, 3, 5), which are detected by the phase current and current change amount detection unit 8 and have a phase difference of 120 degrees from each other.

A PWM generation unit 4 generates three-phase high-side and low-side PWM signals U±, V±, and W± based on the three-phase voltage command values Vu, Vv, and Vw, and outputs them as gate drive signals to the inverter unit 5. The inverter unit 5 generates three-phase alternating voltages that drive the electric motor 6 based on the supplied direct current power supply and the supplied gate drive signal. The detailed configuration of the PWM generation unit 4 and the inverter unit 5 will be described later.

Figure 2:
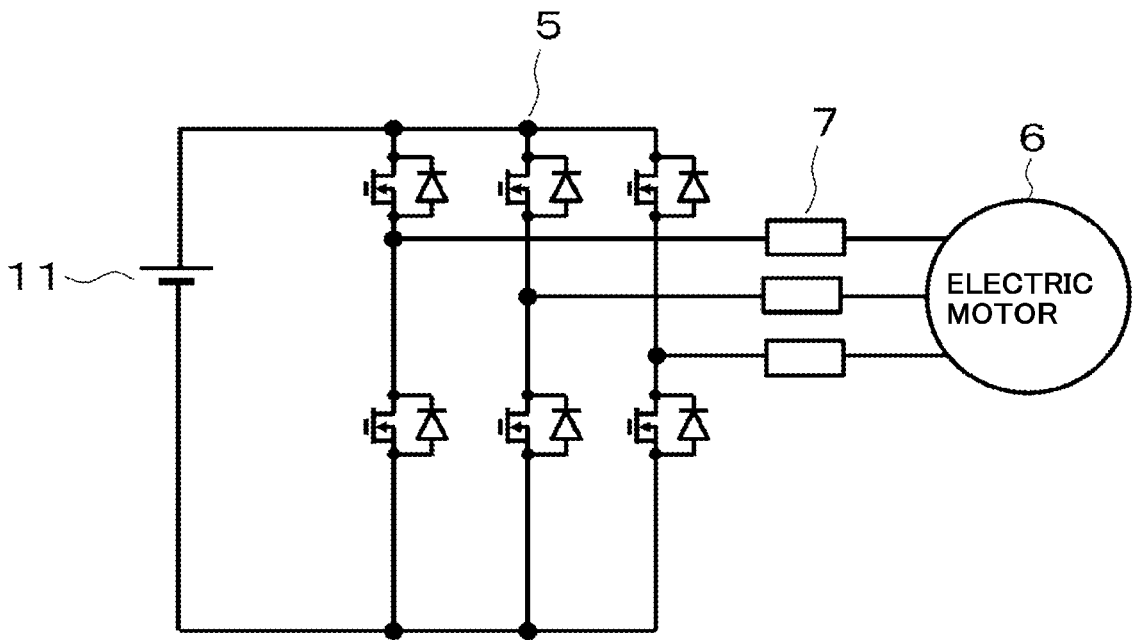
FIG. 2 is a (first) diagram showing a specific configuration example of a current detector.
Figure 3:
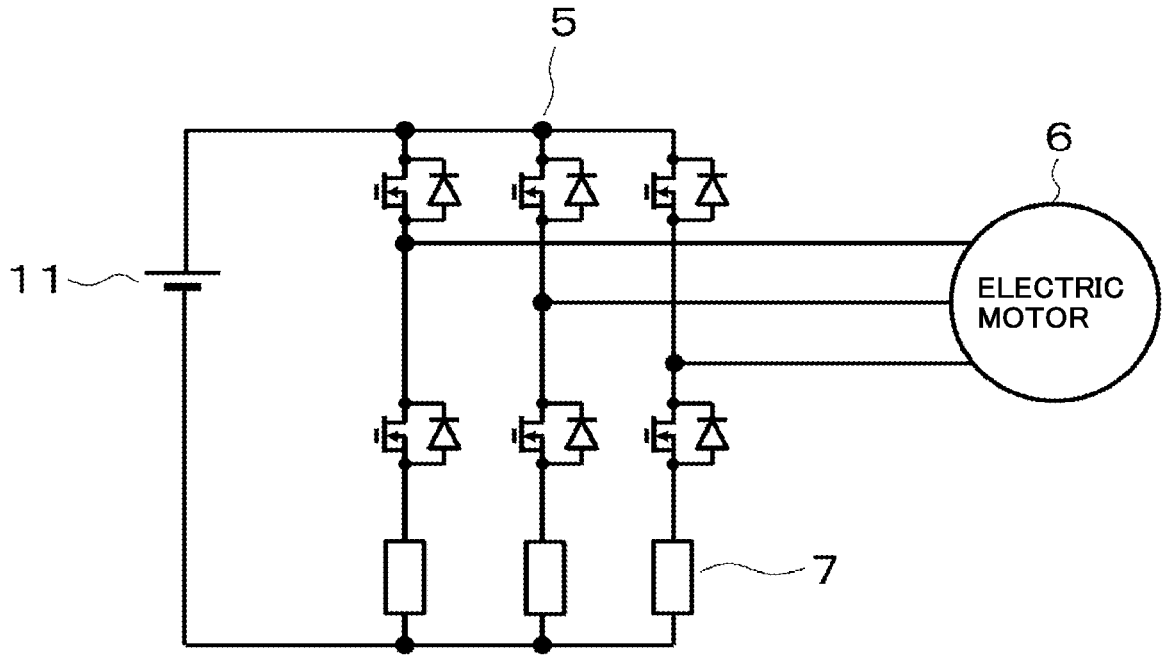
FIG. 3 is a (second) diagram showing the specific configuration example of the current detector.

The current detector 7, corresponding to the current detection element, detects each phase current flowing through the electric motor 6, and generates a signal according to the detection result. As the current detector 7, a shunt resistor, a current transformer (CT) or the like can be used. There are cases where the current detector 7 is provided in series to an output part of the inverter unit 5 using a CT as shown in FIG. 2 and where the current detector 7 is provided between lower switching elements of the inverter unit 5 and the lower side of the direct-current power supply using a shunt resistor as shown in FIG. 3. The phase current and current change amount detection unit 8 detects a current signal of each phase generated in the current detector 7 by performing analog-to-digital conversion on the current signal, based on a current detection timing signal synchronized with the period of a carrier wave of the PWM carrier and obtained by the PWM generation unit 4. The details of the detection process of the phase current will be described later.

As shown in FIGS. 2 and 3, in the inverter unit 5, a plurality of switching elements are connected by a three-phase bridge, and these switching elements are on/off controlled in accordance with the PWM signal patterns, to convert direct current to three-phase alternating currents. In the inverter unit 5, a pair of unit cells, each of which is a switching element with a diode connected in parallel, are connected in series, with one cell being on a positive side and the other cell being on a negative side as viewed from a direct-current power supply 11. Examples of the switching elements may include MOSFETs, IGBTs, power transistors, and wide-gap semiconductors such as SiCs and GaNs.

Three pairs of unit cells, corresponding to three phases, are connected in parallel to the direct-current power supply 11. Hereinafter, the unit cells on the positive side are referred to as upper arms, and the unit cells on the negative side as lower arms. The "upper arm" is synonymous to the "positive arm", and the "lower arm" to the "negative arm". In addition, connection points between the upper arms and the lower arms are the output terminals of the respective phases in the inverter unit 5, and these connection points are connected to the electric motor 6 that is constituted of a DC brushless motor.

When a CT is used for the current detector 7, the current detector 7 can detect current without being influenced by the on-off state of the switching elements. When a shunt resistor is used for the current detector 7, the current detector 7 is influenced by the on-off state of the switching element and can detect current when the lower arm switching elements are turned on. Hereinafter, current detection using a shunt resistor, which is more restrictive than current detection using CT, will be described as an example.

Figure 4:
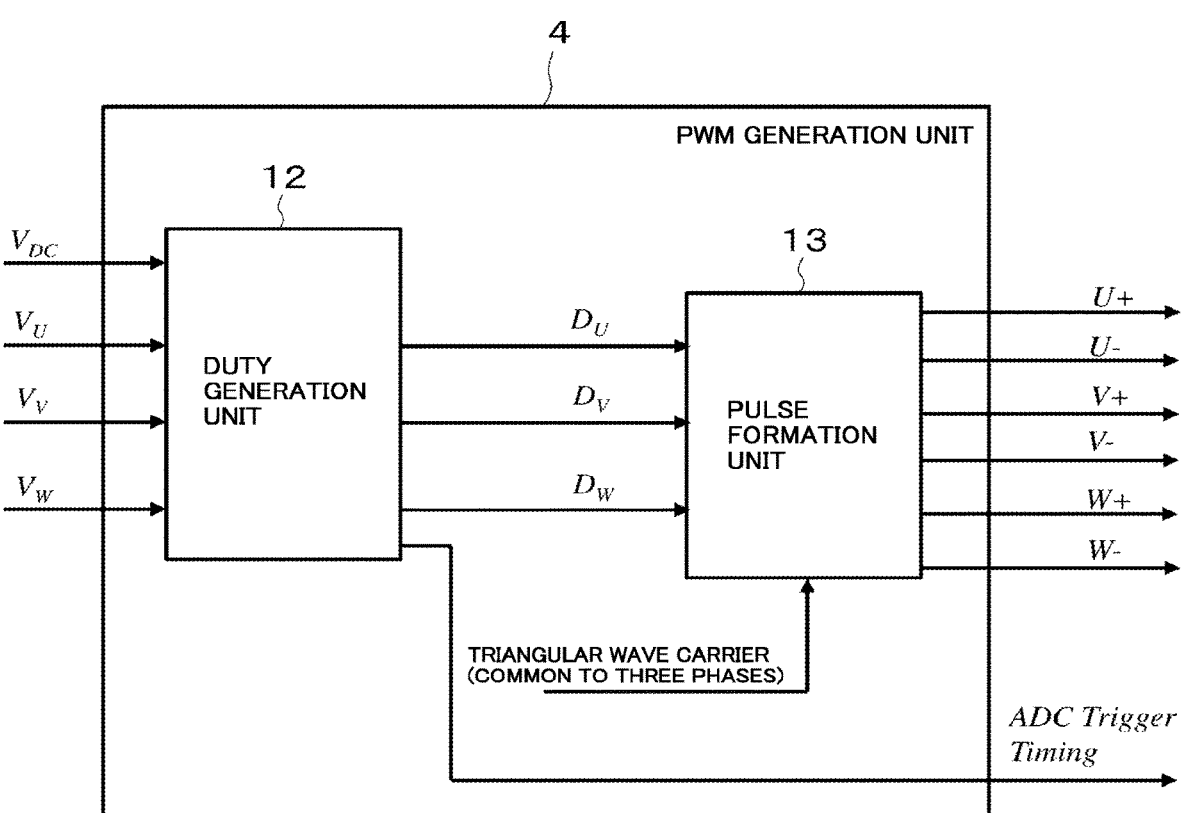
FIG. 4 is a functional block diagram showing an internal configuration of a PWM generation unit.

The PWM generation unit 4 has a duty generation unit 12 and a pulse formation unit 13 as shown in FIG. 4. The duty generation unit 12 determines the duty ratio, which is a ratio of pulse widths in the PWM signal of each phase, based on the three-phase voltage command values Vu, Vv, and Vw and a voltage value VDC of the direct-current power supply. The pulse formation unit 13 generates a PWM signal pattern of each phase as a gate drive signal to drive the switching elements of the inverter unit 5, based on the duty ratio of each phase. The process in the PWM generation unit 4 will be described later in detail. These components described above constitute an electric motor controller 14.

6

Figure 9:
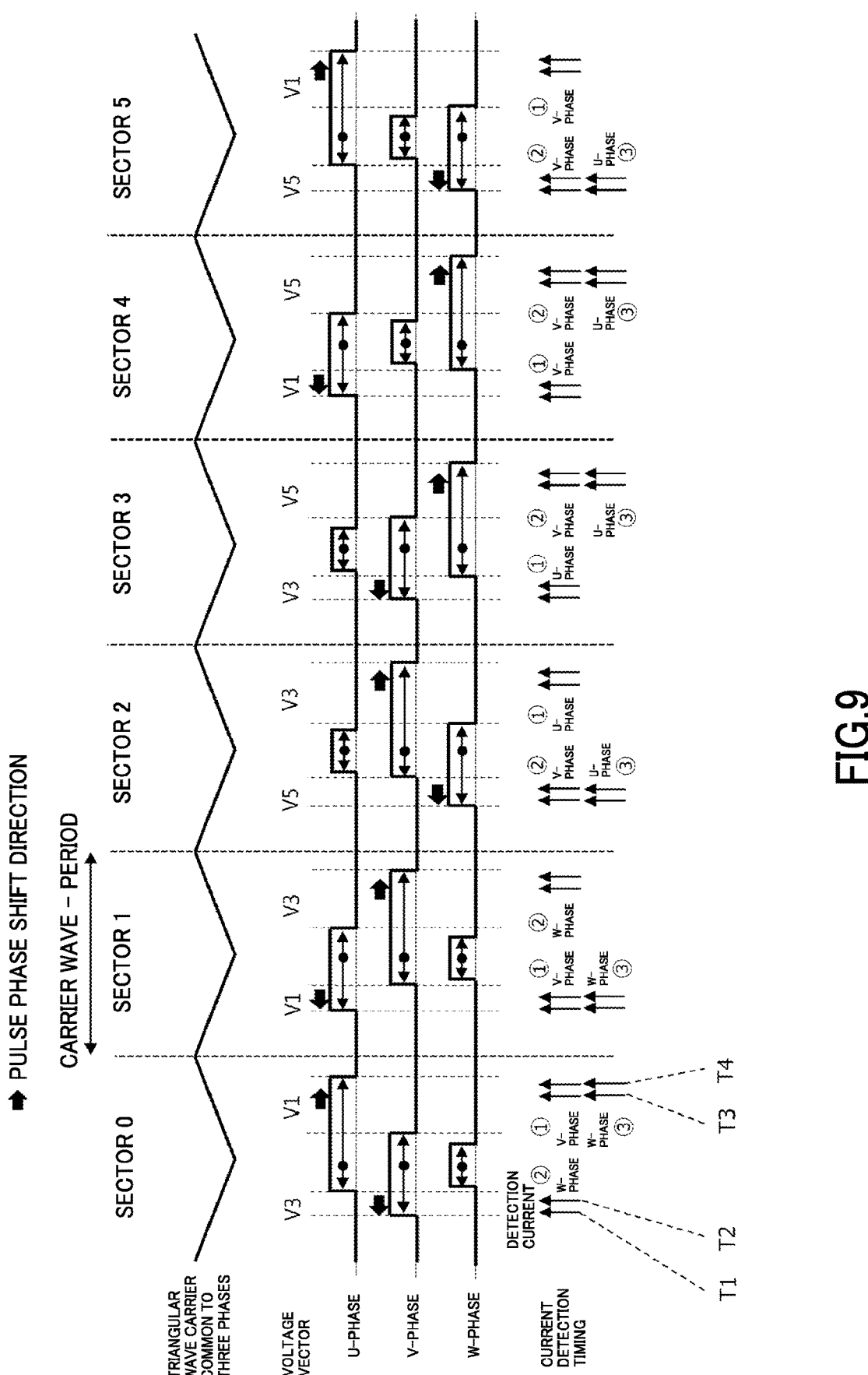
FIG. 9 is a diagram showing a triangular wave carrier, phase pulses of respective phases for each sector, and current detection timing in one electric angle period.

Next, the effects of the present embodiment will be described. The phase current and current change amount detection unit 8 detects a current signal of each phase output from the current detector 7 twice during the period when two types of voltage vectors are generated in one carrier wave period, based on a current detection timing signal that is input. In other words, the current signal of each phase is detected four times within one period of the carrier wave. Since one phase is detected in one voltage vector segment, and two phases, which are made up of the one phase and another phase, are detected in the other voltage vector segment, the number of times of detection per phase is six as shown in FIG. 9. The phase in which the current signal is detected depends on sectors each divided by the voltage vector.

The phase current and current change amount detection unit 8 calculates two current change amounts dIx_Vn for one phase x detected in the segment of one voltage vector Vn, two current change amounts dIx_Vm and dIy_Vm for two phases x and y detected in the segment of another voltage vector Vm, and outputs these current change amounts to the magnetic pole position estimation unit 10. Here, x and y are any of current signal detection phases u, v, and w, and n and m are any of voltage vectors 1, 3, or 5. Since the sum of the three-phase currents is zero, the phase current and current change amount detection unit 8 calculates three-phase current signals Iu_detect, Iv_detect, and Iw_detect based on the current signals for two phases, and outputs the three-phase current signals to the three-phase to dq coordinate conversion unit 9. As the current signals for two phases, any of six detection values detected in one period of the carrier wave, e.g., a first detection value in the segment of the voltage vector in which the current signals for two phases are detected, is used.

The magnetic pole position estimation unit 10 calculates the estimated magnetic pole position θ using three current change amounts having a phase difference of 120 degrees from each other. The three-phase to dq coordinate conversion unit 9 converts the detection current values Iu_detect, Iv_detect, and Iw_detect to dq-axes currents Id and Iq based on the estimated magnetic pole position θ, and outputs the dq-axes currents to the current control unit 2.

Here, the details of the pulse generation process and the current detection process described above, and the magnetic pole position estimation process based on these processes will be described with reference to FIGS. 5 to 18.

[Pulse Generation Process]

Figure 5:
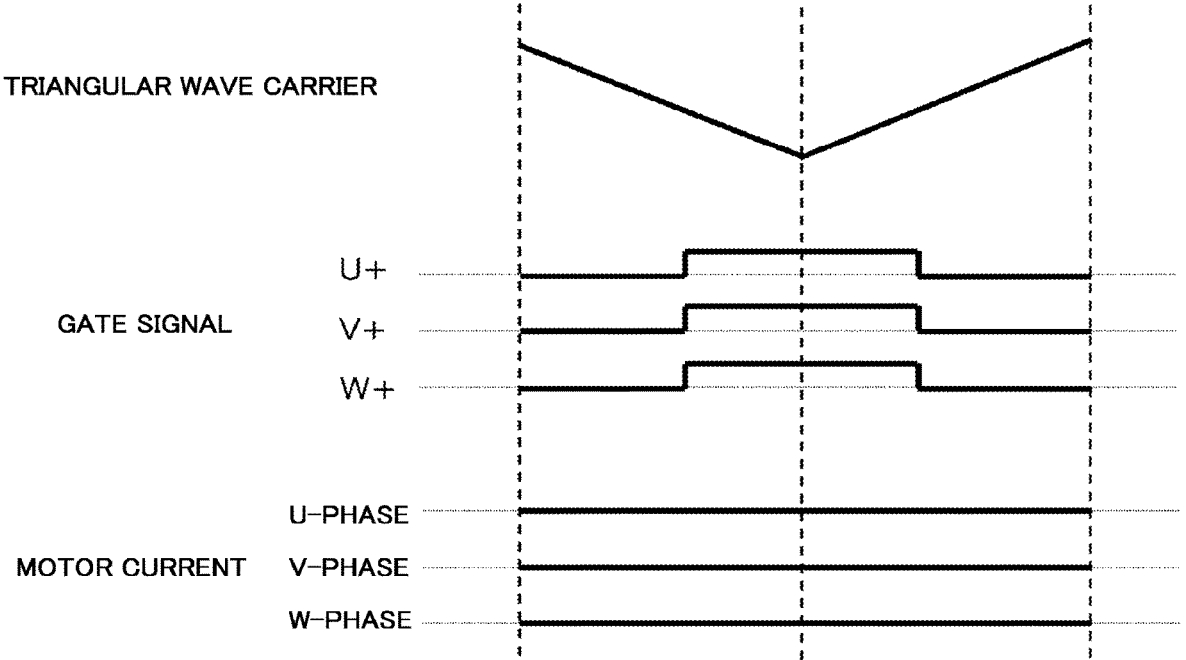
FIG. 5 is a diagram showing PWM signal pulses and motor currents of three phases generated by a typical triangular wave comparison method.

First, the pulse generation process by the PWM generation unit 4 will be described. For example, when the three-phase voltage command values Vu, Vv, and Vw are zero, and the PWM signal patterns of three phases have a uniform duty of 50%, duty generation by the typical triangular wave comparison method yields three-phase signal pulses as shown in FIG. 5. In this case, since a pulse generation reference phase and a pulse width of each phase are identical, switching of the inverter unit 5 corresponds to an all-phase on or all-phase off state. Therefore, during the entire segment of one PWM control period, no voltage is applied between each phase terminal of the electric motor 6, and each phase current is zero. In such a state, the magnetic pole position detection using inductance that is based on current detection is not available because current ripple, which constitutes high-frequency current amplitude, is not generated.

In the present embodiment, when the three-phase voltage command values Vu, Vv, and Vw are zero, and the three-phase PWM signal patterns have a uniform duty of 50%, the pulse generation phase of each phase pulse is shifted as described below. Accordingly, unlike FIG. 5, the voltage of a carrier wave period component is applied to the electric motor 6 in one period of PWM control, resulting in generation of a high-frequency current ripple that enables detection of the magnetic pole position. First, for the three-phase PWM signal patterns, a maximum phase with a maximum duty ratio, a minimum phase with a minimum duty ratio, and an medium phase between these phases are discriminated. Even when the three-phase voltage command values Vu, Vv, and Vw are zero, and the three-phase PWM signal patterns have a uniform duty of 50%, the sector at the time of, for example, start-up of the electric motor 6 is set to an initial value.

Figure 6:
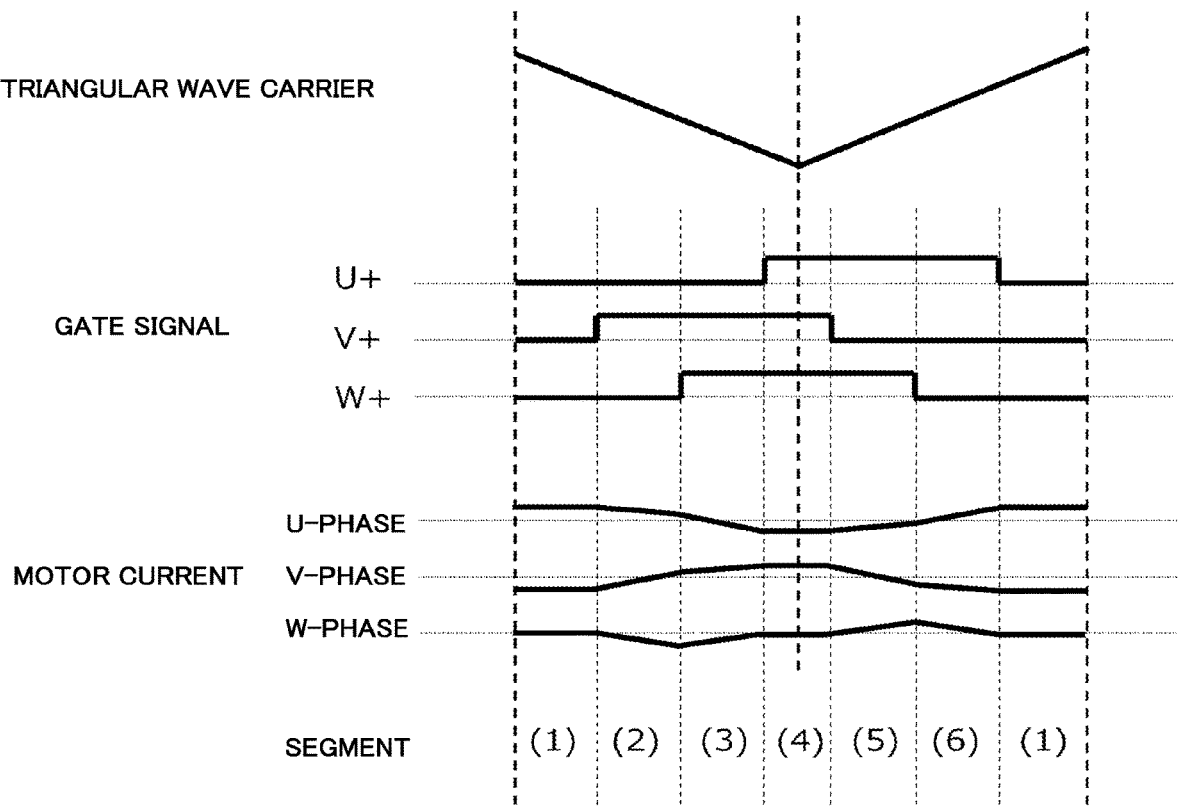
FIG. 6 is a diagram showing PWM signal pulses and motor currents of three phases with the phases being shifted in the first embodiment.

An example of the pulse generation process is shown in FIG. 6. In FIG. 6, the PWM carrier is a triangular wave, and the bottom of the triangular wave, indicating a minimum amplitude value of the triangular wave, is set as a center phase of a period. In this example, assuming that the U-phase is the maximum phase, the V-phase is the medium phase, and the W-phase is the minimum phase, there are shown a gate signal of the upper switching element of each phase when the initial value of the sector is zero, and a waveform of the current of each phase. The maximum phase is shifted in one direction of the advancing side or the delay side with any phase of the carrier wave period as a reference, the medium phase is shifted in a direction opposite to the maximum phase with the any phase of the carrier wave period as a reference, and the minimum phase is not shifted.

Hereinafter, the duty ratio may simply be referred to as "duty".

The pulses of all three phases use the central phase as a reference phase. The U-phase pulse is shifted to the advancing side on the right side of the diagram until the segment where only the U-phase pulse is generated appears. The V-phase pulse is shifted to the delay side on the left side of the diagram until the segment where only the V-phase pulse is generated appears. At this time, the setting value of the duty ratio is adjusted every half period of the carrier, so that the pulse width before phase shift is equal to the pulse width after phase shift.

A segment (6) in which only the U-phase pulse is generated is set by shifting the U-phase pulse, so that a pulse width difference between the U-phase and W-phase becomes the sum of a detection period of the current change amount and a fixed period that is a current detection mask period in which the influence of current pulsation, generated when the switching elements of the W-phase change to the on state, is negligible. Similarly, a segment (2) in which only the V-phase pulse is generated is set by shifting the phase of the V-phase pulse, so that a pulse width difference between the V-phase and W-phase becomes the sum of the detection period of the current change amount and the current detection mask period in which the switching elements of the V-phase change to the on state.

In this case, considering the voltage between each phase terminal of the electric motor 6, one period shown in FIG. 6 is divided into six segments (1) to (6). In the segments (1) and (4), all phases are set to on or off, and therefore no voltage is applied between each phase terminal of the electric motor 6 and the current of each phase is unchanged as in FIG. 5. In the segment (2), since only the V-phase is set to on, the voltage vector is V3 (010) (see FIG. 10), and the direct-current voltage VDC is applied from the V-phase to UW-phases, and the V-phase current increases with inclination due to inductance of the electric motor 6. At this time, a negative voltage is applied to the U-phase and W-phase terminals, so the U-phase current and W-phase current decrease.

Similarly, a voltage vector V4 (011) (see FIG. 10) is given in the segment (3), a voltage vector V6 (101) (see FIG. 10) is given in the segment (5), and a voltage vector V1 (100) (see FIG. 10) is given in the segment (6), to cause current flow. When the phase currents in the segments (1) to (6) are summed up when each phase has a uniform duty ratio of 50%, the average current in all three phases becomes zero as a result of the increase and decrease in each phase current and therefore, phase currents similar to the PWM signal patterns shown in FIG. 5 are provided, except that current ripple of the carrier frequency occurs in each phase. Specifically, when the pulse generation phase of the three-phase PWM signal pulses are shifted as shown in FIG. 6, high-frequency current amplitude can be given to the carrier frequency with the average value of the three-phase currents remaining unchanged.

Figure 7:
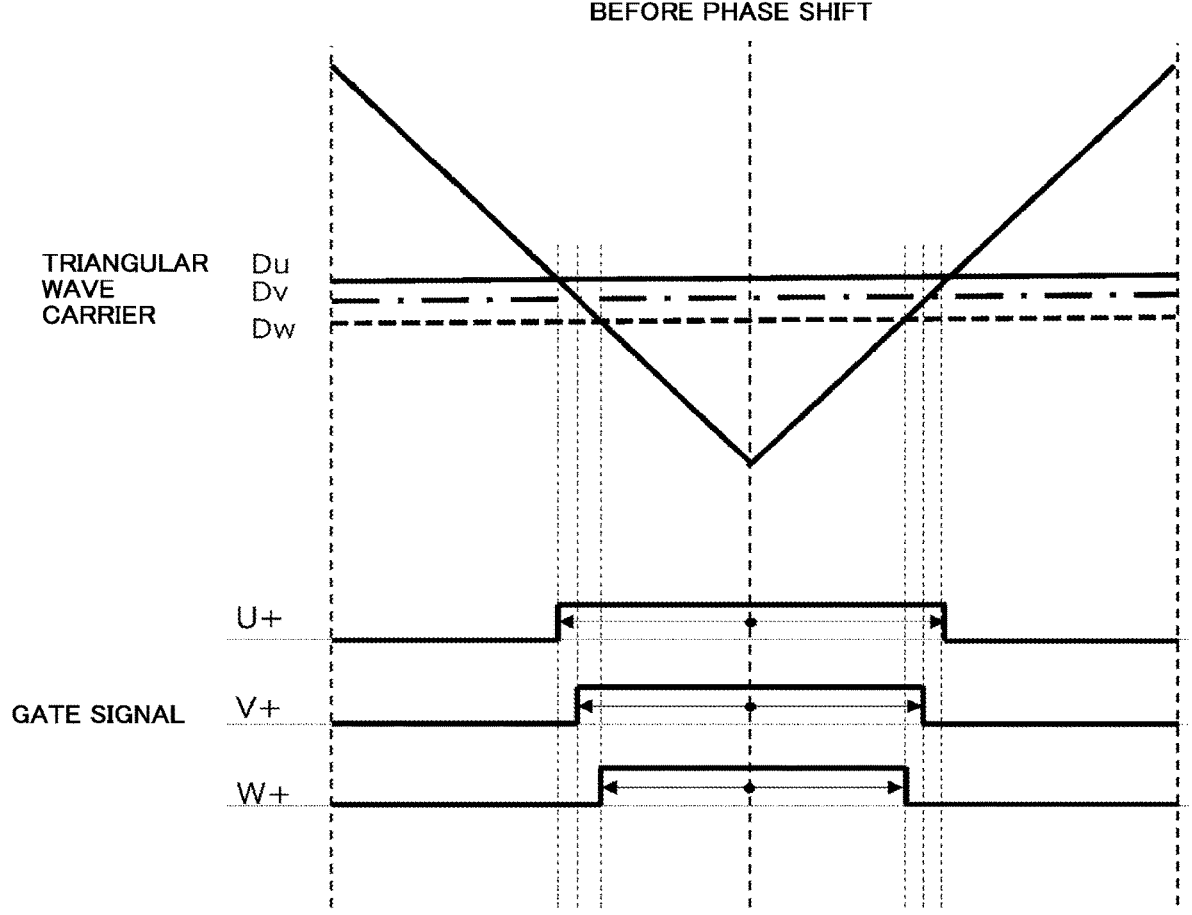
FIG. 7 is a diagram showing three-phase duty command values before phase shift.

Next, the effect of generating PWM signal pulses with the patterns shown in FIG. 6 will be described with reference to FIGS. 7 to 9. The three-phase voltage command values Vu, Vv, and Vw, determined in the dq to three-phase coordinate conversion unit 3, are converted to duty values Du, Dv, and Dw of the respective phases based on the detected direct-current voltage value by the duty generation unit 12. The duty values Du, Dv, and Dw of respective phases are given to the pulse formation unit 13, where the values are compared with the level of the carrier wave, and three-phase PWM signals are generated. Lower arm-side signals are also generated by inverting the three-phase PWM signals, and after a dead time is added as necessary, the PWM signals U±, V±, and W± of respective phases are output to the inverter unit 5.

In the present embodiment, a triangular wave carrier common to three phases is used, and in the magnitude relation of duty ratios that change for each sector (see FIG. 9), the maximum phase is shifted in one direction of the advancing side or the delay side with any phase of the carrier wave period as a reference, and the medium phase is shifted in a direction opposite to the maximum phase with the any phase of the carrier wave period as a reference. The pulse formation unit 13 compares the duties Du, Dv, and Dw of the respective phases with the levels of the carrier of the respective phases, and outputs a high level pulse in the period of (duty)>(carrier).

Figure 8:
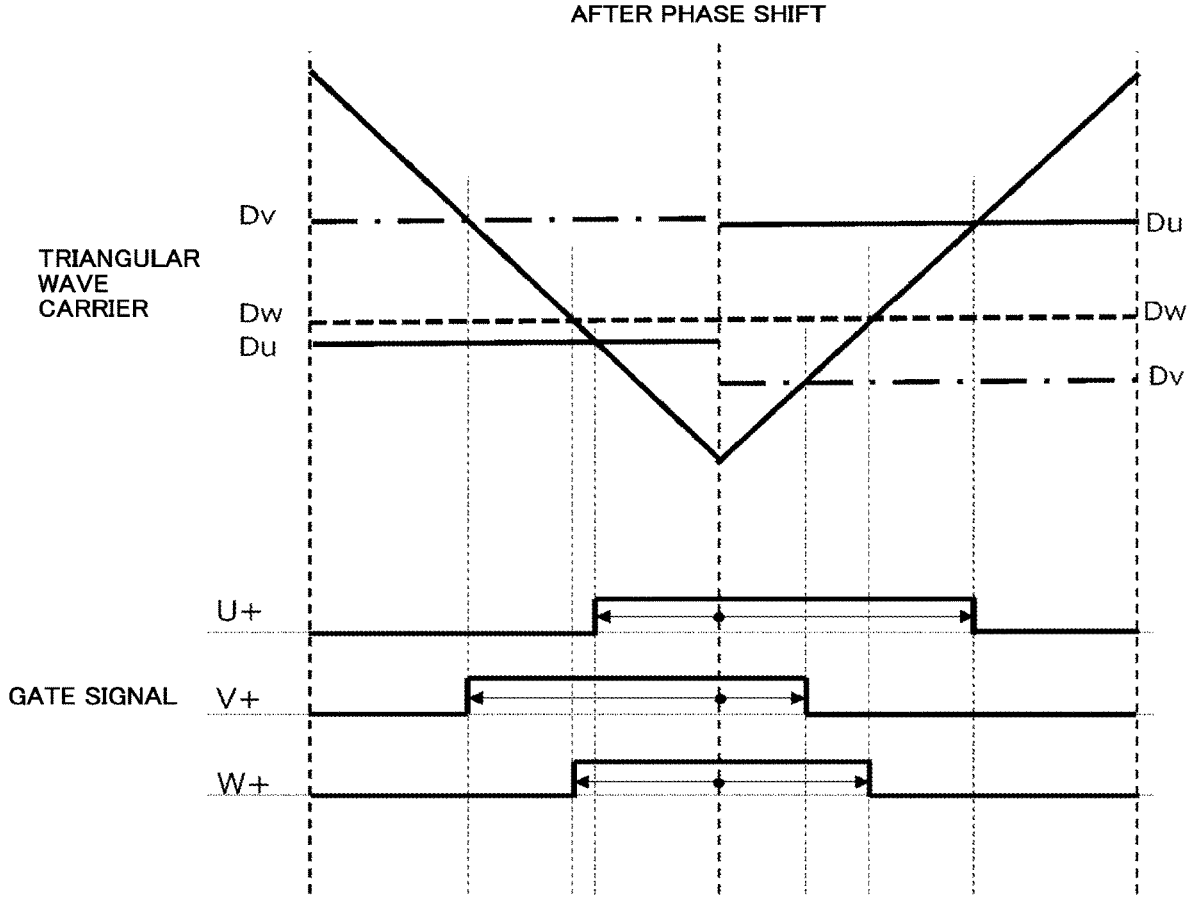
FIG. 8 is a diagram showing three-phase duty command values after phase shift.

As a result, as shown in FIG. 8, with the bottom of the triangular wave carrier being the reference phase of the period, the U-phase PWM signal pulse U+ shifts from the reference phase to the advancing side that is on the right side of the diagram in the case of sector 0. The V-phase PWM signal pulse V+ shifts from the reference phase to the delay side on the left side of the diagram. The W-phase PWM signal pulse W+ does not shift.

[Current Detection Process]

Next, the current detection process by the phase current and current change amount detection unit 8 will be described. The phase current and current change amount detection unit 8, which is provided with a current detection timing signal from the PWM generation unit 4, detects three-phase currents in conformity with the current detection timing signal. As described above, the detection timing is the timing of four points calculated based on difference in duty width in each phase, the detection period of the current change amounts, and the current detection mask period in one period of the carrier wave that is the carrier of the PWM signal. The detection timing is set so that each phase current is detected twice in the period of two types of voltage vector.

Figure 10:
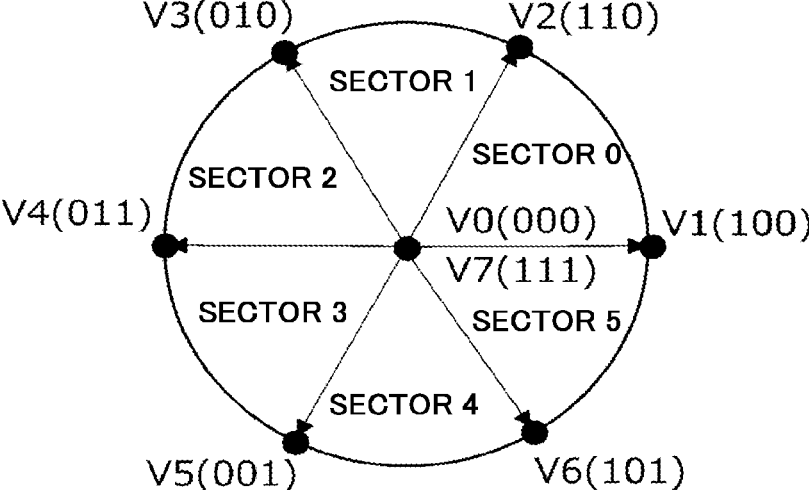
FIG. 10 is a diagram showing the relationship between voltage vectors V0 to V7 and sectors 0 to 5.

FIG. 9 shows a triangular wave carrier, phase pulses of respective phases for each sector, and current detection timing in one electric angle period. FIG. 10 shows the relationship between voltage vectors V0 to V7 and sectors 0 to 5. Current detection is performed four times within one carrier wave period based on given signals of timing T1, T2, T3, and T4 for detecting the three-phase currents. For example, downcounting of the triangular wave carrier is started from a highest count value, timing T1, T2 are set within the period before the count value reaches zero, and timing T3 and T4 are set within the period after the count value reaches zero and upcounting is started and before the count value reaches the highest value.

Figure 11:
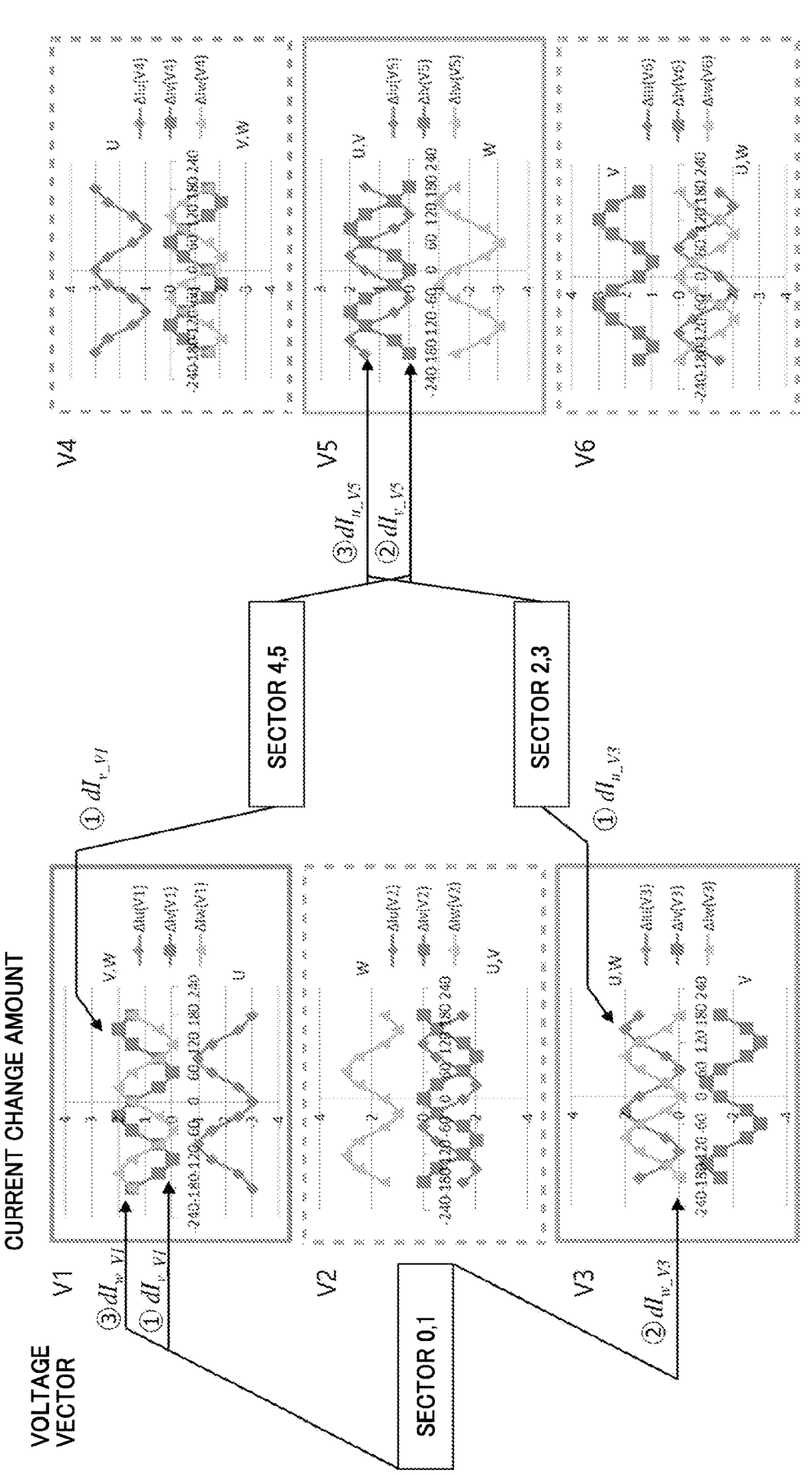
FIG. 11 is a (first) diagram showing current detection patterns for respective sectors, which can provide three current change amounts having a phase difference of 120 degrees from each and having an equal direct current offset amount.
Figure 12:
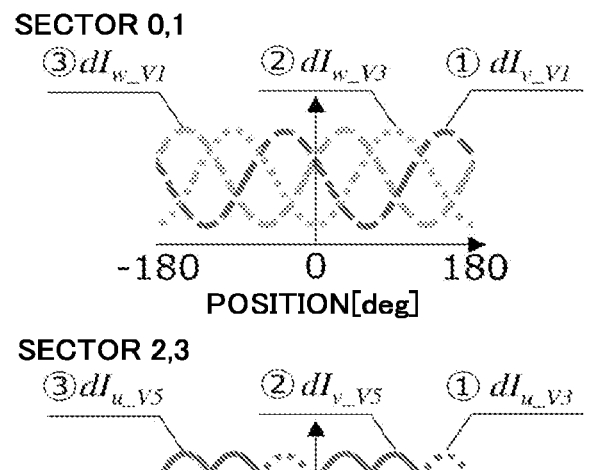
FIG. 12 is a (second) diagram showing current detection patterns for respective sectors, which can provide three current change amounts having a phase difference of 120 degrees from each and having an equal direct current offset amount.
Figure 12:
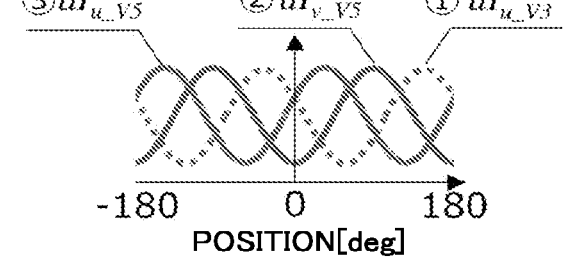
Figure 12:
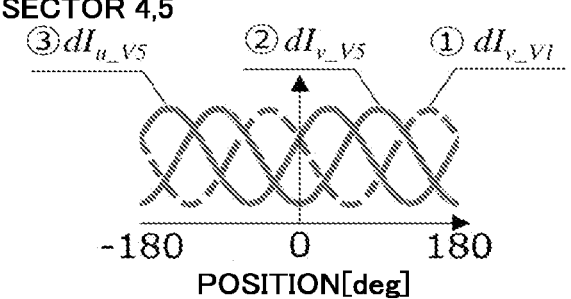

The phase current and current change amount detection unit 8 sets the detection timing in this way and obtains a differential value between the detection currents at T1 and T2, to compute a current change amount dIw_V3 in the case of sector 0. Similarly, the phase current and current change amount detection unit 8 obtains differential values between the detection currents at T3 and T4, to compute current change amounts dIv_V1 and dIw_V1. Differential time T2–T1 is set to be equal to T4–T3. FIGS. 11 and 12 show current detection patterns for respective sectors, which can provide three current change amounts having a phase difference of 120 degrees from each and having an equal direct current offset amount. The detection current phase is set in accordance with the change of the sector.

[Process of Estimating Magnetic Pole Position]

Figure 13:
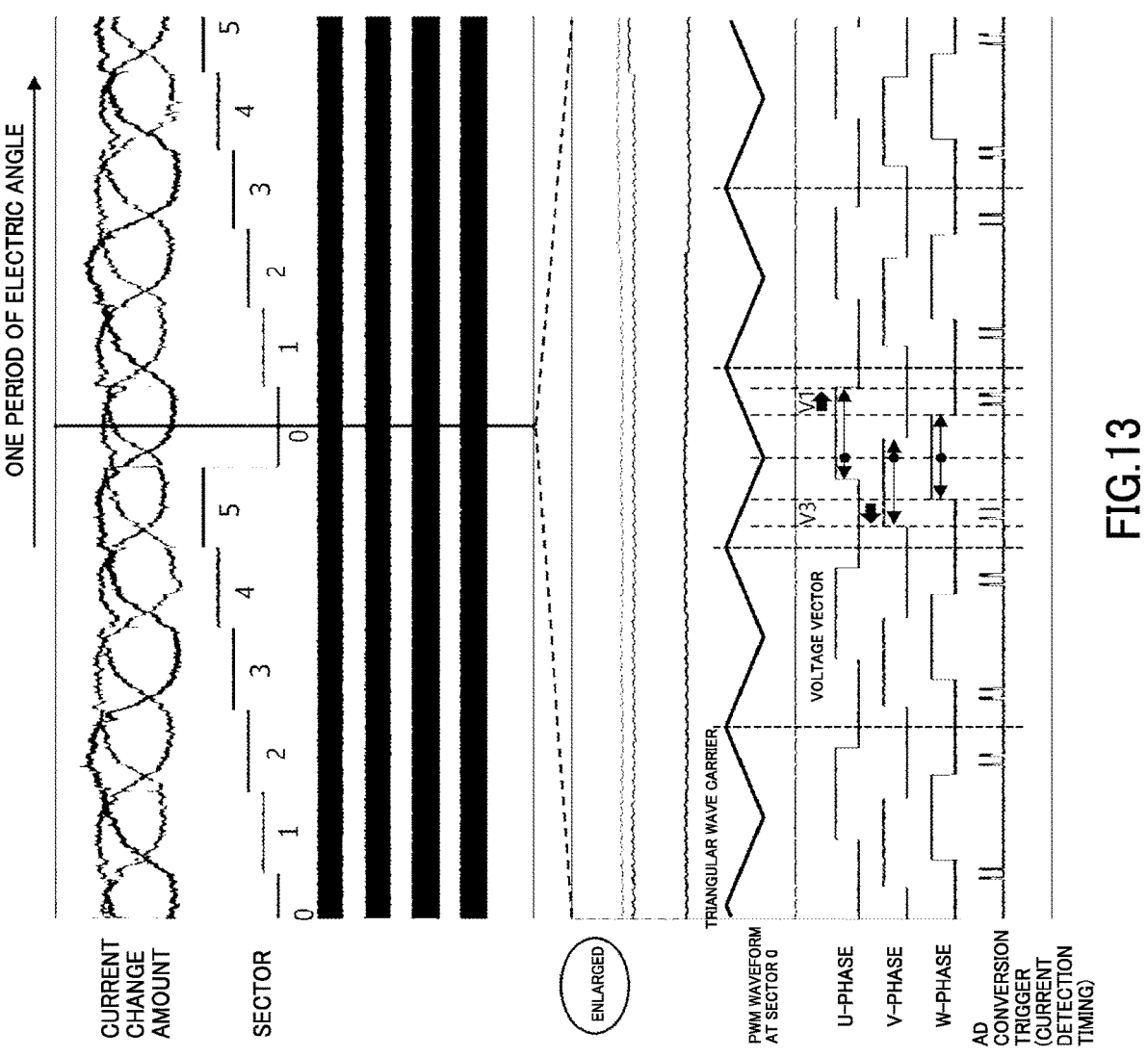
FIG. 13 is a diagram showing the current change amount, output voltage sectors, gate signals of three phases, and current detection timing, when the PWM signal patterns are applied to a permanent magnet motor in the present embodiment.

The process of estimating the magnetic pole position by the magnetic pole position estimation unit 10 will be described. FIG. 13 shows the current change amount, output voltage sectors, three-phase gate signals, and current detection timing, when, for example, the PWM signal patterns according to the present embodiment are applied to an embedded magnet-type permanent magnet motor. Each current change amount changes at 2θ, which is twice longer than one electric angle period. In the case of an electric motor with a saliency, information indicating the magnetic pole position of the electric motor is included. Therefore, in the case of sector 0, the estimated value θ can be obtained by performing three-phase/two-phase conversion and inverse tangent operation based on three current change amounts obtained as described above according to an equation below.

[Expression 1]

$$\begin{pmatrix} \Delta\alpha \\ \Delta\beta \end{pmatrix} = \sqrt{\frac{2}{3}} \begin{pmatrix} \cos(0) & \cos\left(\frac{2}{3}\pi\right) & \cos\left(\frac{4}{3}\pi\right) \\ \sin(0) & \sin\left(\frac{2}{3}\pi\right) & \sin\left(\frac{4}{3}\pi\right) \end{pmatrix} \begin{pmatrix} dI_w\_V3 \\ DI_v\_V1 \\ DI_w\_V1 \end{pmatrix} \quad (1)$$

$$\theta = \frac{1}{2}\tan^{-1}\frac{\Delta\beta}{\Delta\alpha} \quad (2)$$

Here, the estimated position θ obtained from equation (2) is divided from 2θ, and therefore the estimated position has an error of ±180° in principle. Therefore, an algorithm to identify the initial position is required in order to determine which is the original position in a stopped state before driving of the electric motor 6. The determination is made by a method using the characteristics of magnetic saturation, which is a conventional publicly-known technology. For example, a following document shows one of the methods according to the publicly-known technology.

Transactions of Institute of Electrical Engineers of Japan D (Publication of Industry Applications Society), Vol. 125 (2005), No. 3 "Initial Rotation Position Estimation Method of Surface Magnet Synchronous Motor using Pulse Voltage", Osamu Yamamoto and Takahiro Ara Then, the estimated speed ω is obtained by time differentiation of the estimated position with the control period.

[Details of Duty Setting Method and Current Detection Timing]

Figure 14:
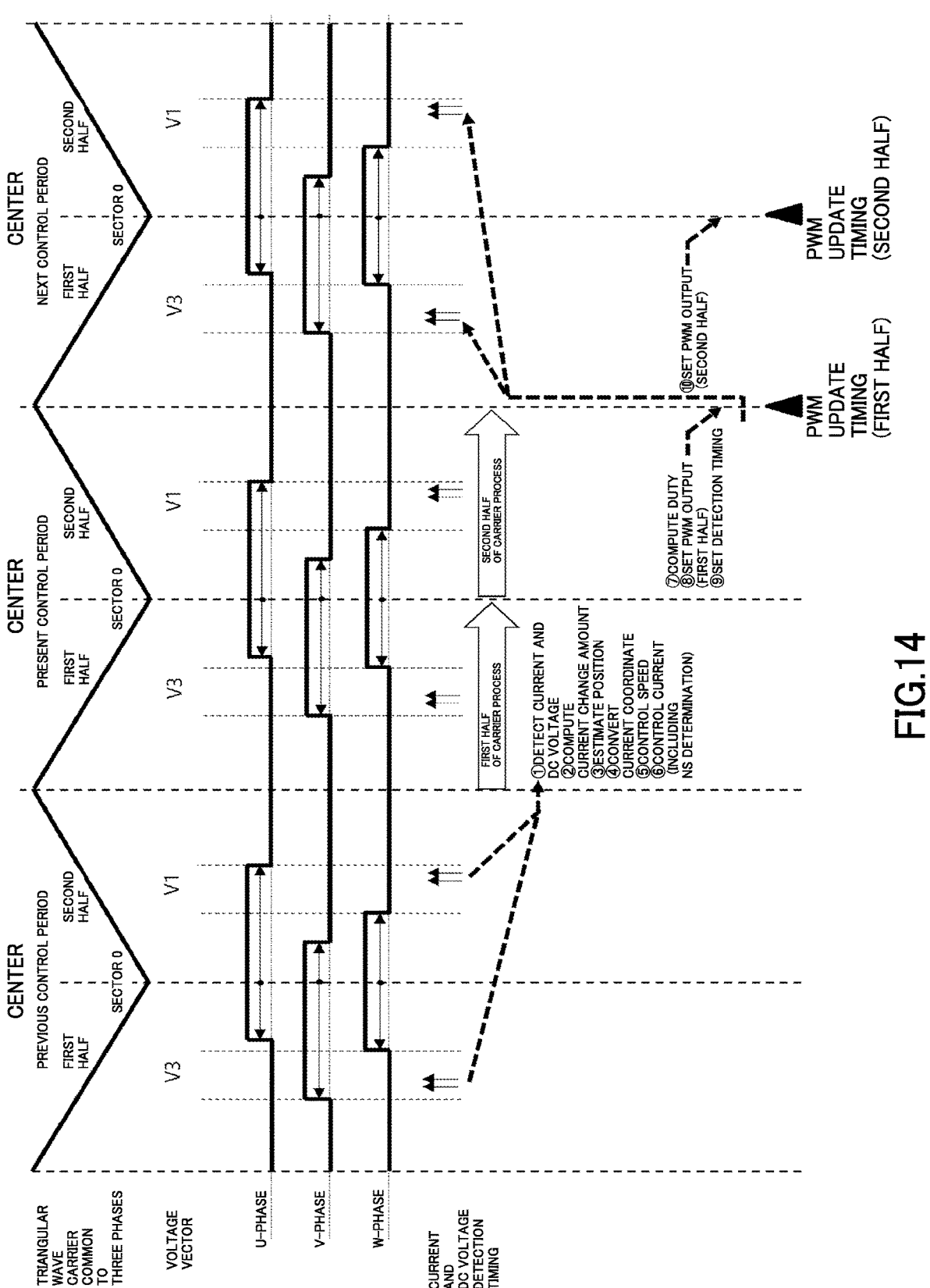
FIG. 14 is a timing chart showing the processing details of vector control in the case of sector 0.

FIG. 14 is a timing chart showing vector control in the case of sector 0. Vector control is performed by a series of processes (1) to (10) shown in FIG. 14, which correspond to the control block diagram shown in FIG. 1. The processes (1) to (10) correspond to circled numbers in the drawing. The following description is given with a "present control period" as a reference. In (1) current and direct-current voltage detection, the detection value of a previous control period is computed, and then the processes are performed in order of (2) to (6) in the first half of the carrier period, and in order of (7) to (9) in the second half of the carrier period.

In (8) PWM output setting (first half) and (9) detection timing setting, the duty of PWM pulses and current detection timing in a next control period are computed. At the end of the present control period, the PWM pulses in the first half of the carrier of the next control period are set, and also the current and direct-current voltage detection timing in the next control period is set. Then, in the first half of the carrier of the next control period, the process of (10) PWM output setting (second half) that is chronologically the last process is executed, and at the center of the next control period, the PWM pulses in the second half of the carrier of the next control period is set.

Figure 15:
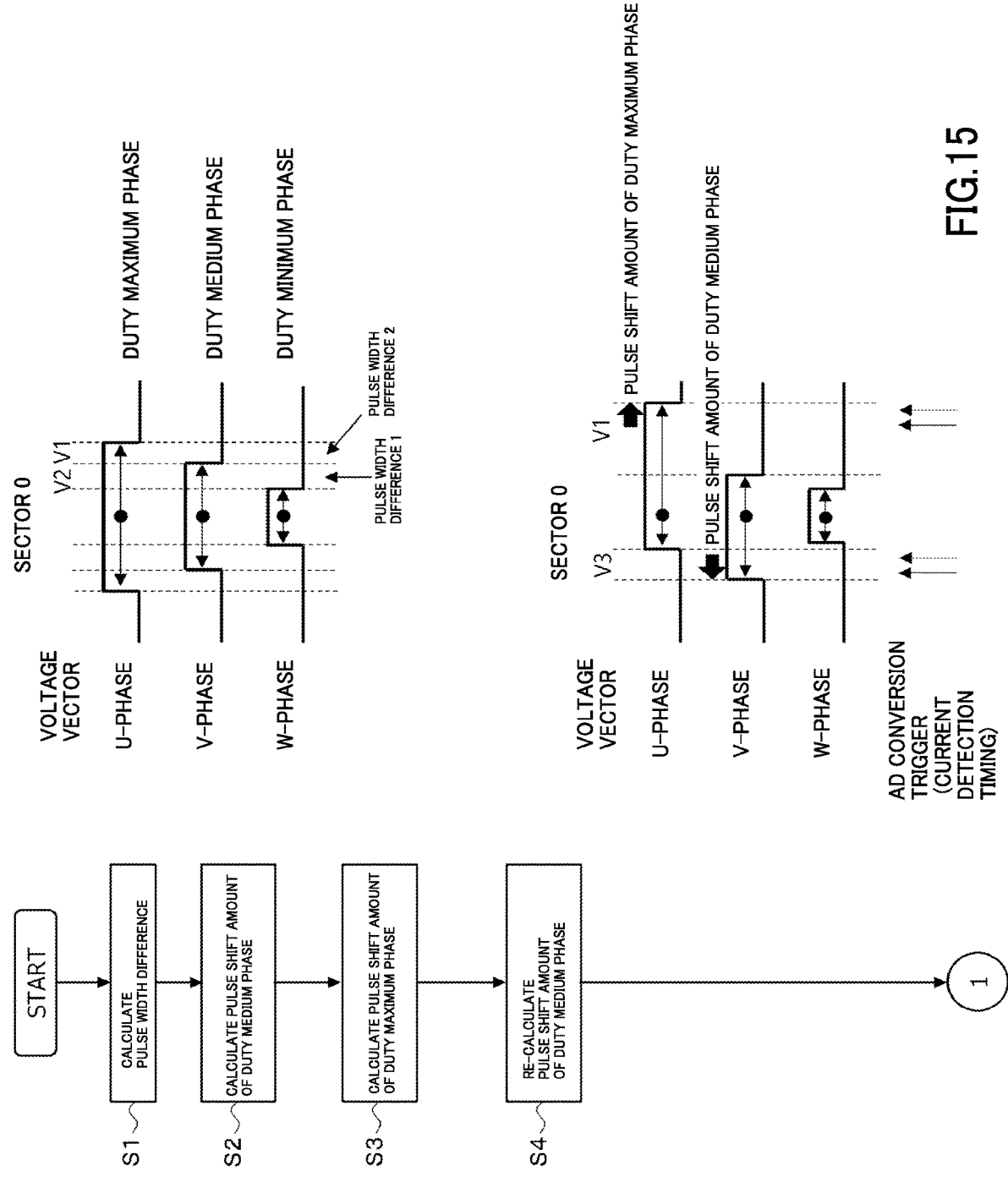
FIG. 15 is a (first) flowchart corresponding to the processes (7) to (9) shown in FIG. 14.
Figure 16:
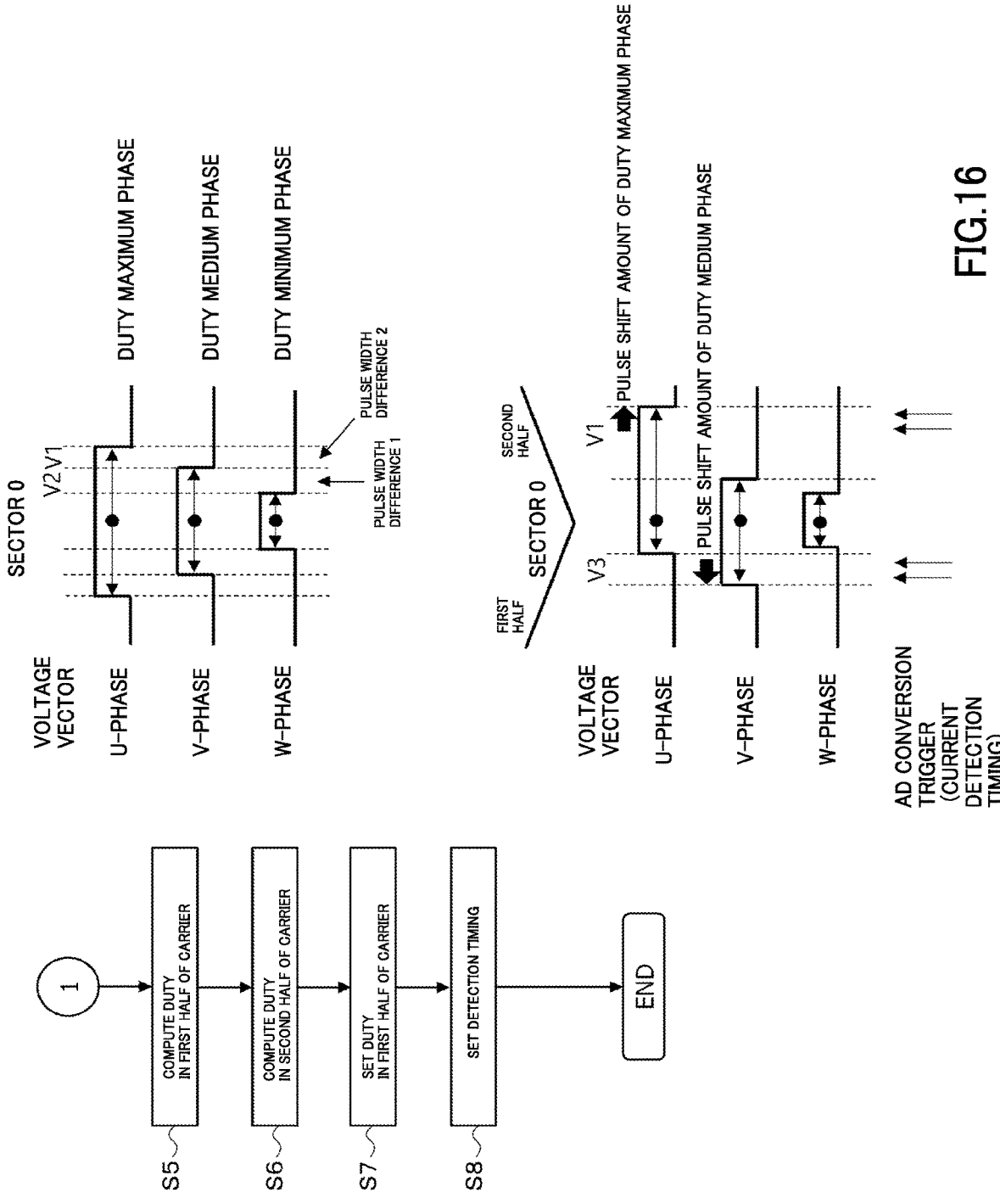
FIG. 16 is a (second) flowchart corresponding to the processes (7) to (9) shown in FIG. 14.

The processes (7) to (10) are described in the flowcharts in FIGS. 15 and 16. Note that a description of the first half of the process of (7) duty computation is omitted because it is a typical three-phase duty computation process by three-phase modulation for vector control. FIG. 15 corresponds to the second half of the duty computation process in (7) and the processes in (8) and (9). First, the three-phase duties obtained in the first half of the previous process (7) are used to compute pulse width difference between a duty medium phase and a duty minimum phase and between a duty maximum phase and the duty medium phase using equation (3) (S1). The duty maximum phase, duty medium phase, and duty minimum phase change for each sector.

Pulse width difference 1 = (3)

(duty medium phase – duty minimum phase)/2

Pulse width difference 2 =

(duty maximum phase – duty medium phase)/2

Next, the phase shift amount of the pulse of the duty medium phase is computed by equation (4) (S2).

Pulse shift amount of duty medium phase=pulse shift amount setting value+pulse width difference 2 (4)

Figure 18:
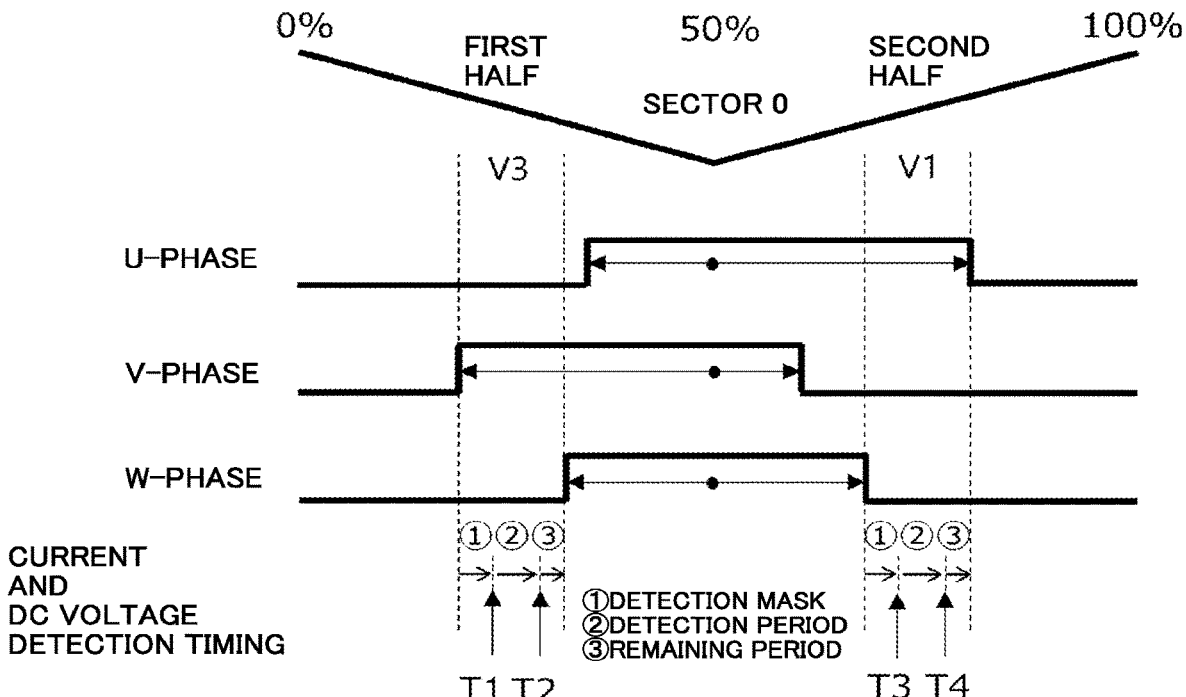
FIG. 18 is a diagram showing current detection timing T1 to T4 in control periods.

Here, as shown in FIG. 18, the pulse shift amount setting value is the sum of a mask period, a detection period, and a remaining period for current detection, which is set in consideration of the influence of current pulsation, generated due to switching in the inverter unit 5.

Next, the pulse shift amount of the duty maximum phase is computed (S3). When the sum of the pulse width difference 1 and the pulse width difference 2 is equal to or less than the pulse shift amount setting value, the pulse shift amount of the duty maximum phase is calculated by equation (5). Otherwise, the phase shift amount is set to zero.

$$
\begin{aligned}
\text{Pulse shift amount of duty maximum phase} = {} & \text{(5)} \\
& \text{pulse shift amount setting value} - \\
& \text{(pulse width difference 1 + pulse width difference 2)}
\end{aligned}
$$

Since shifting the duty maximum phase also influences the shift amount of the duty medium phase which is calculated first, recalculation is performed (S4). When the sum of the pulse width difference 1 and the pulse width difference 2 is equal to or less than the pulse shift amount of the duty maximum phase, the relationship with the duty minimum phase needs to be considered, and therefore the pulse shift amount of the duty medium phase is recalculated by equation (6).

$$
\begin{aligned}
\text{Pulse shift amount of duty medium phase} = {} & \text{(6)} \\
& \text{pulse shift amount setting value} - \text{pulse width difference 1}
\end{aligned}
$$

When the sum exceeds the pulse shift amount of the maximum phase, the pulse shift amount of the duty medium phase needs to be reduced by the shift amount of the duty maximum phase. Accordingly, recalculation is performed by equation (7).

$$
\begin{aligned}
\text{Pulse shift amount of duty medium phase} = {} & \text{(7)} \\
& \text{pulse shift amount of duty medium phase} - \\
& \text{pulse shift amount of duty maximum phase}
\end{aligned}
$$

Pulse shift is not performed for the duty minimum phase.

From the above processes, the pulse shift amounts of the duty maximum phase and medium phase are obtained. These pulse shift amounts are used to compute the duty in the first half and the second half of the career by equation (8) (S5, S6). The positive and negative sign of the second term on the right side of equation (8) changes the direction of the pulse shift. In equation (8), the pulse shift direction defined in FIG. 9 is used. In the first half of the carrier, the sign (−) indicates decrease of the duty so that the PWM pulse shifts to the right, whereas the sign (+) indicates increase of the duty so that the PWM pulse shifts to the left. Similarly, in the second half of the carrier, the sign (+) indicates increase of the duty so that the PWM pulse shifts to the right, whereas the sign (−) indicates decrease of the duty so that the PWM pulse shifts to the left. Thus, in equation (8), the positive and negative signs in the second term on the right side are inverted in the first half of the career and the second half of the career.

$$
\begin{aligned}
\text{Duty maximum phase (first half of carrier)} = {} & \text{duty maximum phase} - \text{(8)} \\
& \text{pulse shift amount of duty maximum phase} \times 2
\end{aligned}
$$

$$
\begin{aligned}
\text{Duty medium phase (first half of carrier)} = {} & \text{duty medium phase} + \\
& \text{pulse shift amount of duty medium phase} \times 2
\end{aligned}
$$

$$
\text{Duty maximum phase (second half of carrier)} = \text{duty maximum phase} +
$$

-continued
$$
\text{pulse shift amount of duty maximum phase} \times 2
$$

$$
\begin{aligned}
\text{Duty medium phase (second half of carrier)} = {} & \text{duty medium phase} - \\
& \text{pulse shift amount of duty medium phase} \times 2
\end{aligned}
$$

The process described hitherto is the process of duty computation in (7).

Next, in the process of PWM output setting (first half) in (8), the duty maximum phase (first half of the carrier) and the duty medium phase (first half of the carrier) determined in (7) are set to the duty maximum phase and duty medium phase that are compared with the triangular wave carrier in the end (S7). The minimum phase is unchanged since pulse shift is not performed. Then, in the process of setting detection timing in (9), the detection timing T1 to T4 shown in FIG. 18 are set according to equation (9) (S8).

$$
\begin{aligned}
T1 = {} & 100\% - (50\% + \text{duty medium phase (first half of carrier)}/ \qquad \text{(9)} \\
& 2 - \text{detection mask \%} \\
T2 = {} & 100\% - (T1 - \text{detection period \%}) \\
T4 = {} & 50\% + \text{duty maximum phase (second half of carrier)}/ \\
& 2 - \text{remaining period \%} \\
T3 = {} & T4 - \text{detection period \%}
\end{aligned}
$$

The detection timing T1 to T4 refer to the duty ratios (%), and the "detection mask %" and "detection period %" refer to duty ratios in accordance with the length of the detection mask time and the detection period.

Figure 17:
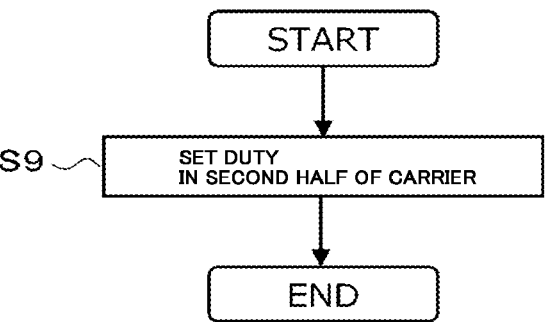
FIG. 17 is a flowchart corresponding to the process (10) shown in FIG. 14.

Finally, as shown in FIG. 17, in the process of PWM output setting (second half) in (10), the duty maximum phase (second half of the carrier) and the duty medium phase (second half of the carrier) determined in (7) are set to the duty maximum phase and duty medium phase that are compared with the triangular wave carrier in the end (S9).

Thus, according to the present embodiment, a plurality of switching elements connected by a three-phase bridge are on/off controlled by triangular-wave carrier comparison based on PWM signal patterns, in which the maximum duty phase and the medium duty phases are shifted in the opposite direction to each other in magnitude relation of the duty ratio that changes for each sector. Accordingly, when the electric motor 6 is driven via the inverter unit 5 that converts direct current into three-phase alternating currents, the PWM generation unit 4 generates three-phase PWM signal patterns to follow a magnetic pole position of the electric motor 6.

The phase current and current change amount detection unit 8 then detects each of three-phase currents twice at four timing points of T1 to T4, calculated based on the duty width difference, the detection period of the current change amount, and the current detection mask period of each phase in the carrier period, to obtain the current change amounts. The magnetic pole position estimation unit 10 estimates the magnetic pole position θ of the electric motor 6 based on the current change amounts. Since the detection points of three current change amounts for estimation of the magnetic pole position are switched for each sector in accordance with the voltage vector that changes for each sector in particular, the region including two types of voltage vectors to be detected can be used as the detection point.

This makes it possible to estimate the magnetic pole position θ with high accuracy without using the position sensor even in a very low speed region including zero speed, without using a combination of serrated wave and triangular wave carriers. Therefore, the present embodiment is easily applicable to various systems.

Second Embodiment

Hereinafter, component parts identical to those in the first embodiment are omitted, and different parts are described below.

In the first embodiment, as shown in FIG. 9, in shifting from an even sector to an odd sector, both the duty maximum phase and the medium phase are shifted in the opposite direction. As a result, the same voltage vector is consecutively generated. This results in a large current ripple.

Figure 19:
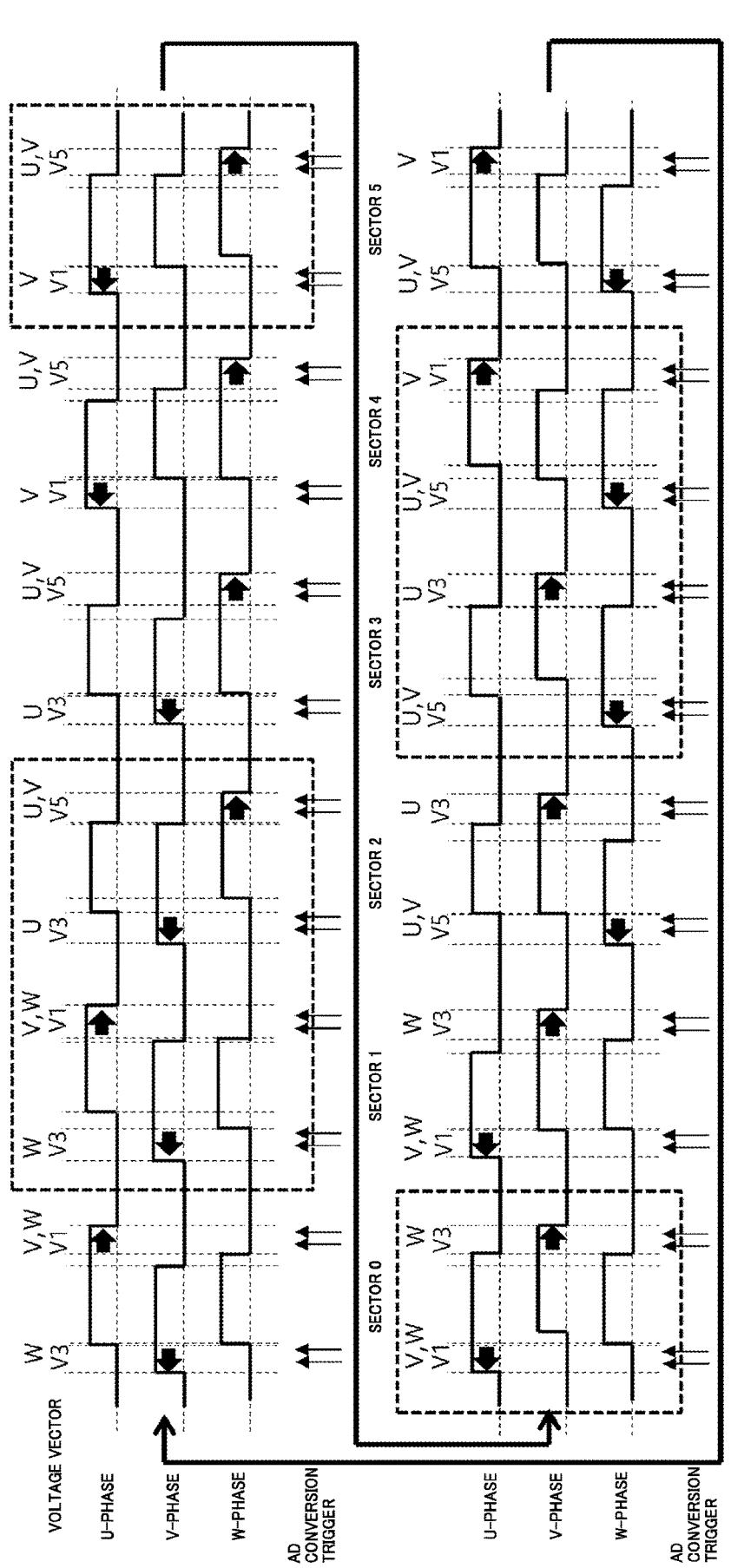
FIG. 19 is a timing chart showing a pulse shift scheme of a second embodiment.

In contrast, in the second embodiment, portions framed by a dashed line are added as shown in FIG. 19. Specifically, the phase shift direction of the PWM pulse is set over two electric angle periods, so as to prevent consecutive generation of the same voltage vector in switchover between sectors. This makes it possible to reduce current ripple. For the phase shift direction of the pulse, the sign of the second term on the right side of equation (8) may be changed in accordance with the switchover between the sectors, as shown in FIG. 19.

Third Embodiment

Figure 20:
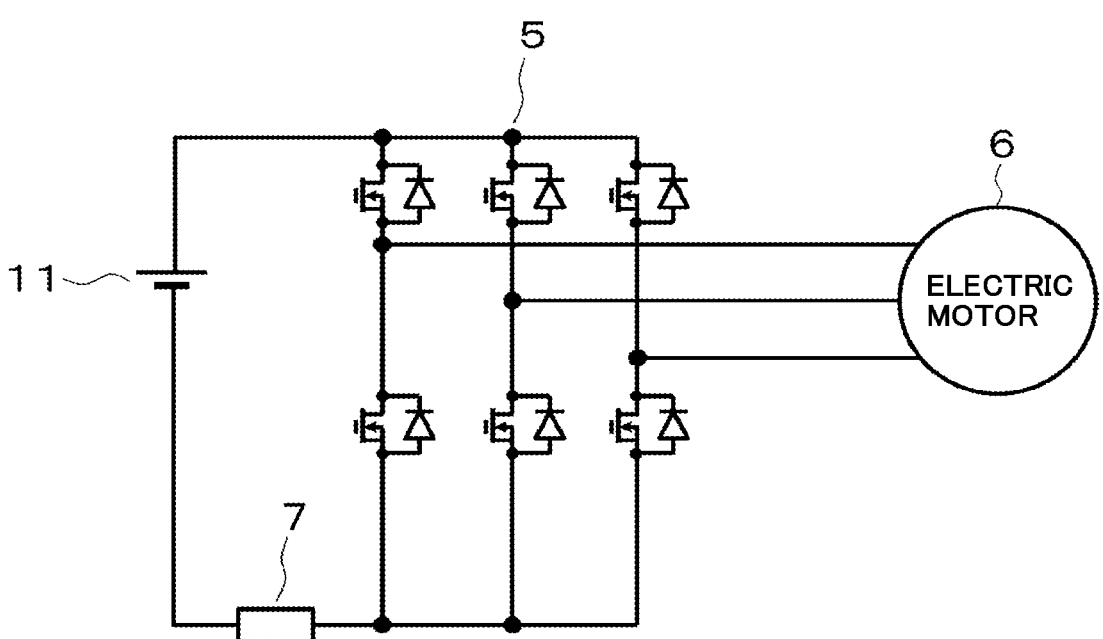
FIG. 20 is a diagram showing a specific configuration example of the current detector in a third embodiment.

A third embodiment shows the case of using one shunt resistor, which is inserted into the direct current side of the inverter unit 5 as shown in FIG. 20. As shown in the upper row of FIG. 21, the shift directions of the PWM pulses are the same as those of the first embodiment, though the combination of the current detection phase and the current change amount for estimation of the magnetic pole position is different. When three shunt resistors are used as in the first embodiment, the current of the phase, in which the pulse is set to off, can be detected. When one shunt resistor is used as in the third embodiment, the current of the phase that is the only phase, in which the pulse is set to on or off, can be detected. For this reason, the first embodiment and the third embodiment are different in the current detection phase with respect to the voltage vector, and are also different in combination of the current change amounts having a phase difference of 120 degrees as shown in FIG. 11.

Figure 21:
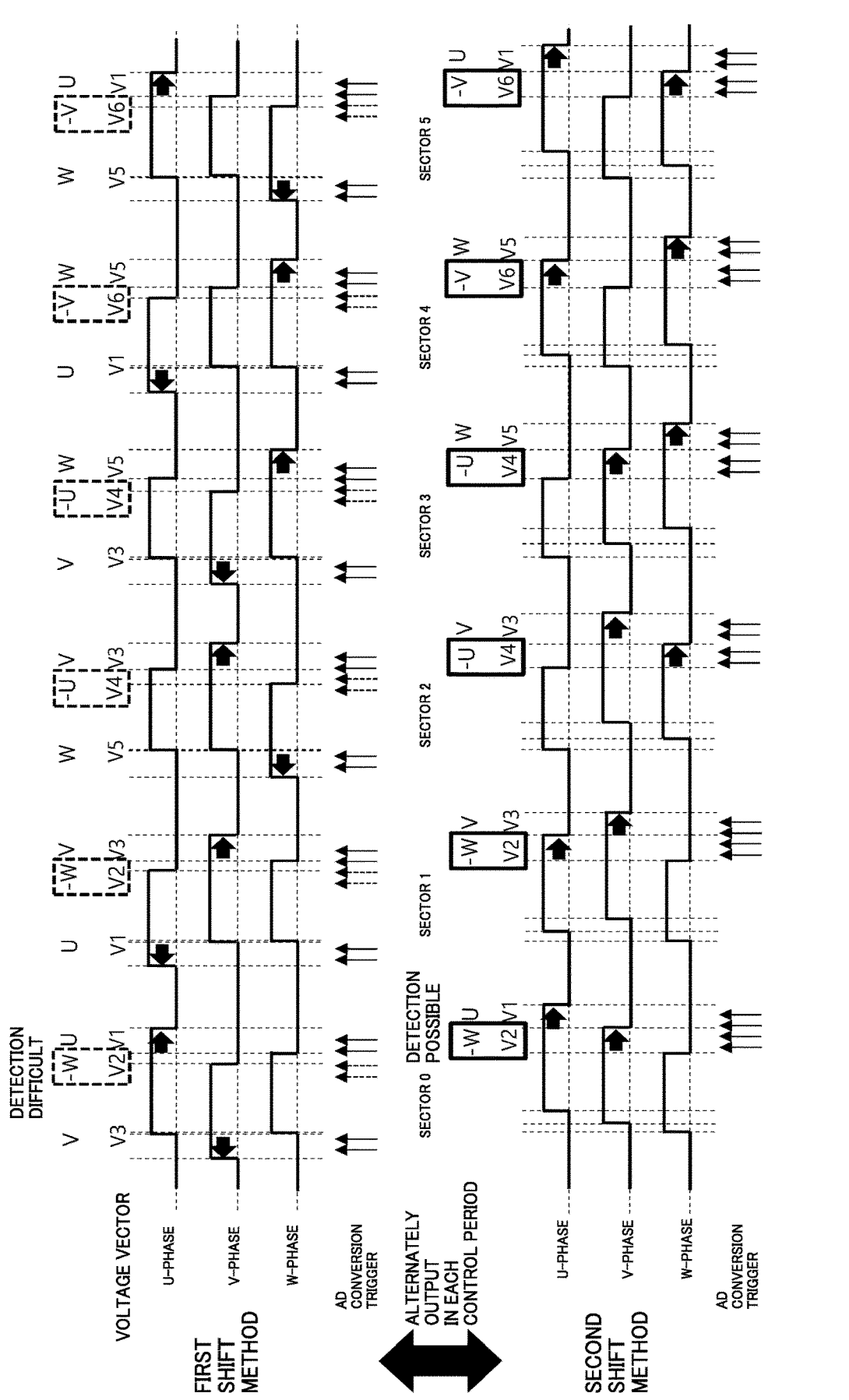
FIG. 21 is a timing chart showing a first shift method and a second shift method.
Figure 22:
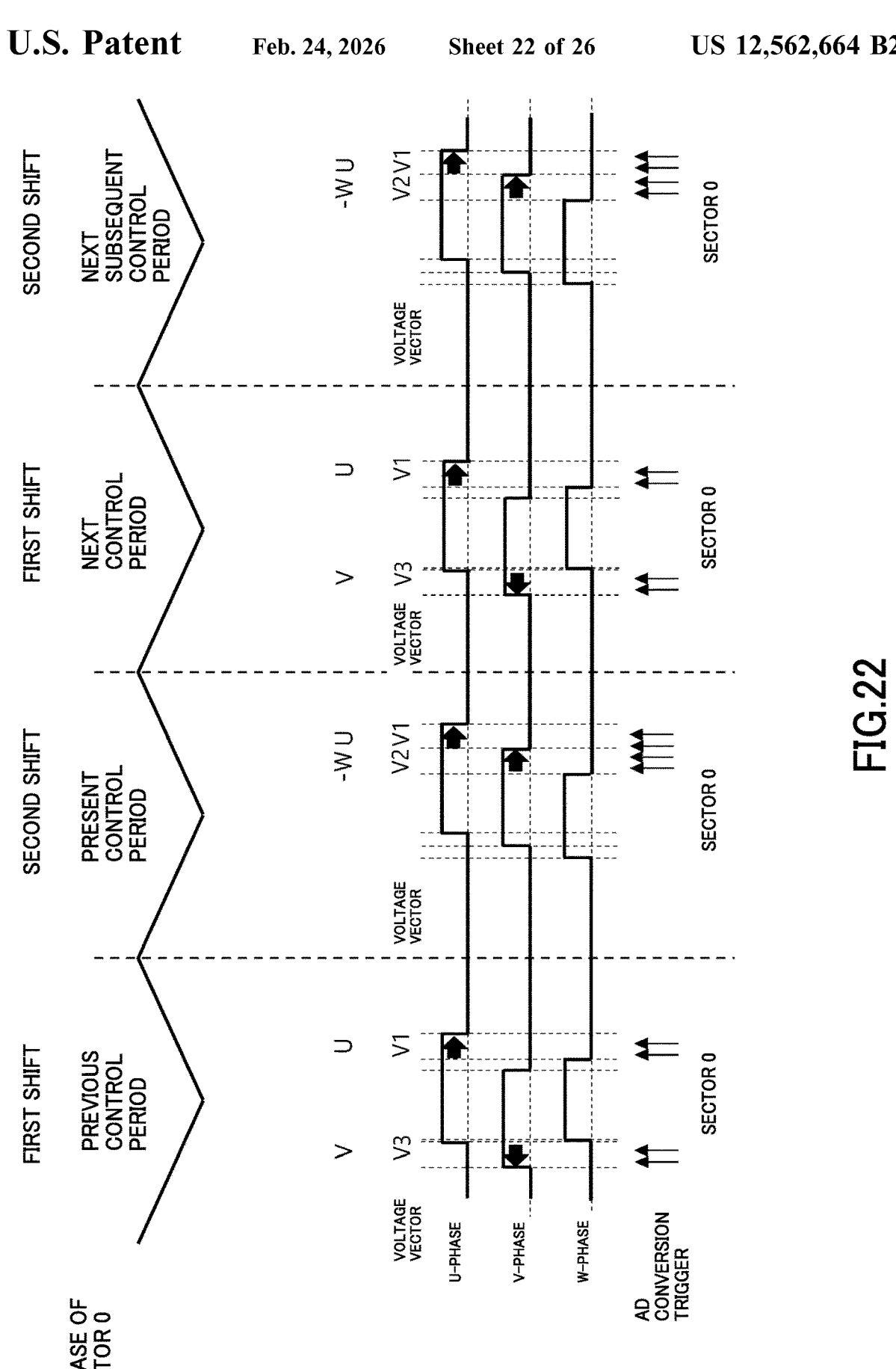
FIG. 22 is a timing chart showing the case of alternatively executing the first shift method and the second shift method in a switching manner.

In sector 0 shown in FIG. 21, in addition to the voltage vectors V1 and V3, the voltage vector V2 is required. However, in the pulse generation method in the first embodiment, it is difficult to simultaneously generate the voltage vectors V1, V2, and V3 and detect the current change amounts in one control period. Accordingly, in the third embodiment, as shown in the lower row of FIG. 21, a method of shifting the duty maximum phase and the medium phase in the same direction is added and performed alternately with the pulse generation method in the first embodiment in each control period. The first shift method is shown in the upper row of FIG. 21, and the second shift method is shown in the lower row of FIG. 21. FIG. 22 shows the PWM pulses generated by combining these two shifting methods in the case of sector 0. By switching the current detection phase and the voltage vector in each control period, the combination of the current change amounts for estimation of the magnetic pole position can be detected in two control periods.

Figure 23:
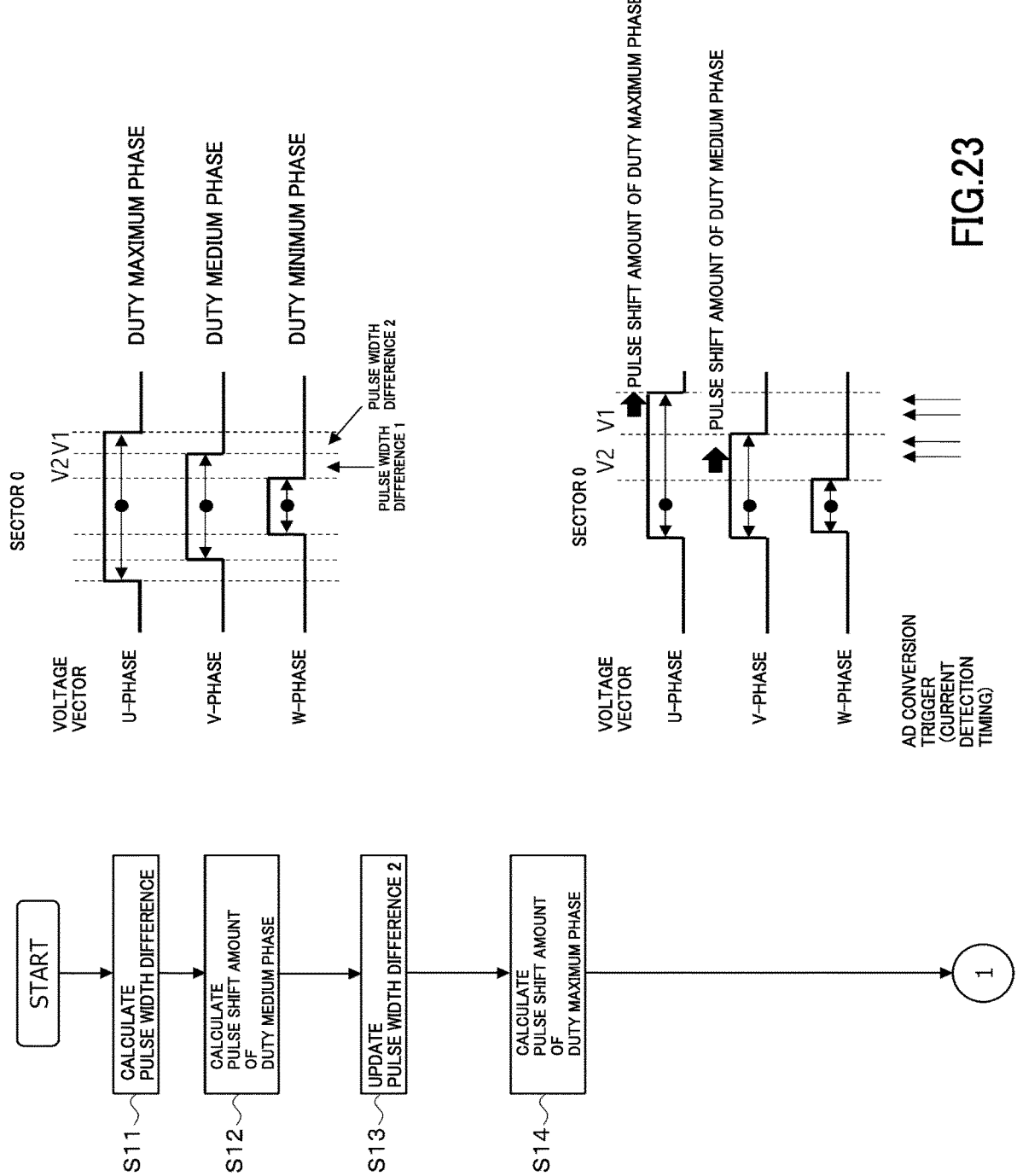
FIG. 23 is a (first) flowchart corresponding to the process shown in FIG. 22.

In the vector control processes (7) to (9) shown in FIG. 14, when one shunt resistor is applied, it is necessary to add the method of shifting the duty maximum phase and the medium phase in the same direction. The flowcharts shown in FIGS. 23 and 24 correspond to the second half of the duty computation process in (7) and the processes in (8) and (9). The same process as in step S1 is performed (S11), and the phase shift amount of the pulse of the duty medium phase is obtained (S12).

Since the phases are shifted in the same direction, the shift amount is larger than that in the first embodiment. Accordingly, the phase shift amount of the duty medium phase is first computed, and then the phase shift amount of the duty maximum phase is computed. When the pulse width difference 1 between the duty medium phase and the duty minimum phase is equal to or less than the pulse shift amount setting value, the pulse shift amount of the duty medium phase is obtained by equation (10). When the pulse width difference 1 exceeds the pulse shift amount setting value, the phase shift amount is zero.

$$\text{Pulse shift amount of duty medium phase} = \tag{10}$$
$$\text{pulse shift amount setting value} - \text{pulse width difference } 1$$

Since the phase shift of the duty medium phase changes the pulse width difference 2 between the duty maximum phase and the duty medium phase, the pulse width difference 2 is recalculated by equation (11) and updated (S13).

$$\text{Pulse width difference } 2 = \text{pulse width difference } 2 - \tag{11}$$
$$\text{pulse shift amount of duty medium phase}$$

Next, the pulse shift amount of the duty maximum phase is computed (S14). When the recalculated pulse width difference 2 is equal to or less than the pulse shift amount setting value, the pulse shift amount of the duty maximum phase is obtained according to equation (12). When the pulse width difference 2 exceeds the pulse shift amount setting value, the phase shift amount is zero.

$$\text{Pulse shift amount of duty maximum phase} = \tag{12}$$
$$\text{pulse shift amount setting value} - \text{pulse width difference } 2$$

Thus, the pulse shift amounts of the duty maximum phase and the duty medium phase can be obtained.

Next, these values are used to compute the duty in the first half and the second half of the career according to equation (13) (S15, S16). Because of the phase shift in the same direction, the positive and negative combination of the sign in the second term on the right side of a next equation is different from equation (8).

$$\text{Duty maximum phase (first half of carrier)} = \tag{13}$$
$$\text{duty maximum phase} -$$
$$\text{pulse shift amount of duty maximum phase} \times 2$$

$$\text{Duty medium phase (first half of carrier)} = \text{duty medium phase} -$$
$$\text{pulse shift amount of duty medium phase} \times 2$$

$$\text{Duty maximum phase (second half of carrier)} = \text{duty maximum phase} +$$
$$\text{pulse shift amount of duty maximum phase} \times 2$$

$$\text{Duty medium phase (second half of carrier)} = \text{duty medium phase} +$$

-continued pulse shift amount of duty medium phase ×2

Figure 24:
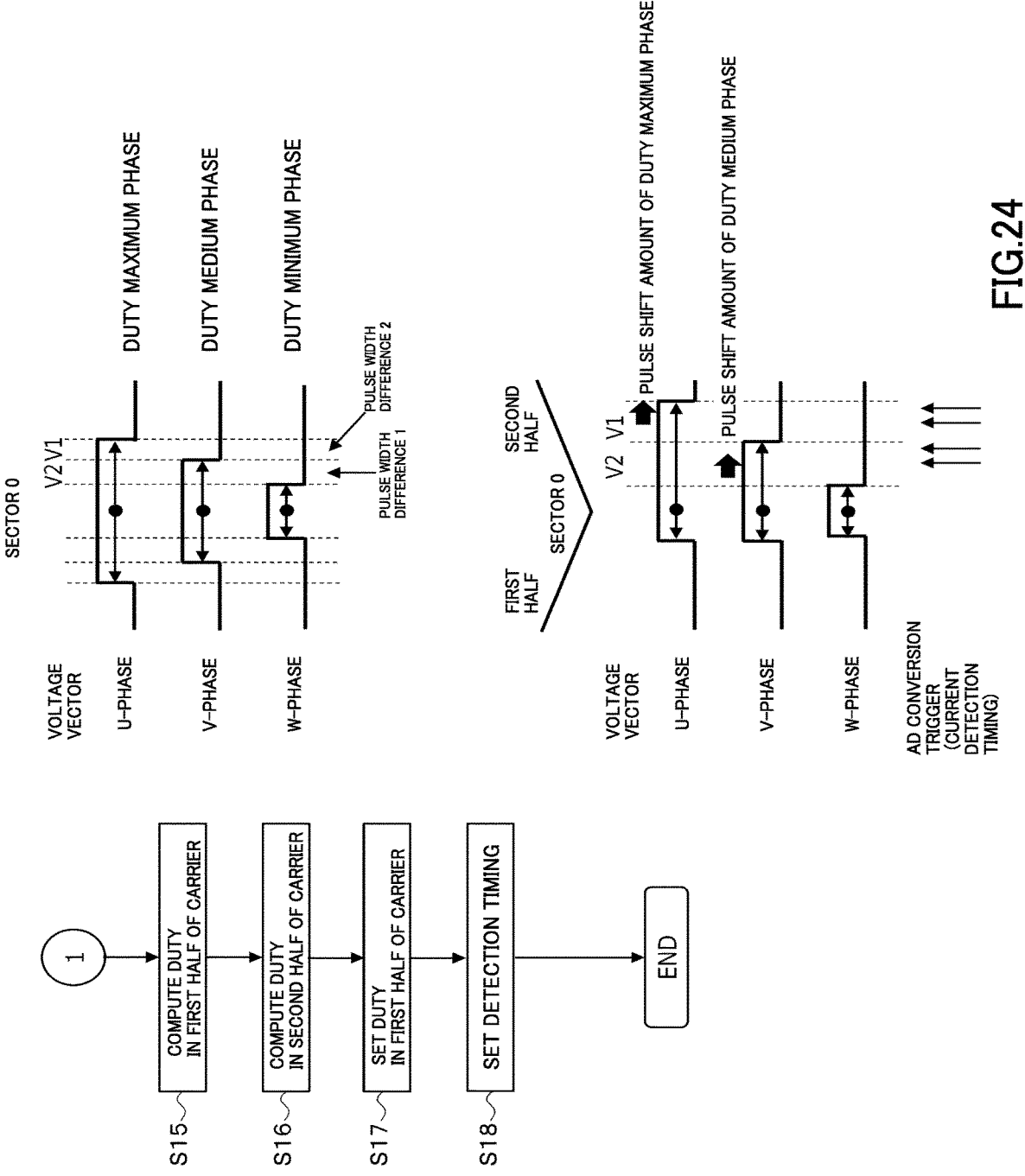
FIG. 24 is a (second) flowchart corresponding to the process shown in FIG. 22.
Figure 25:
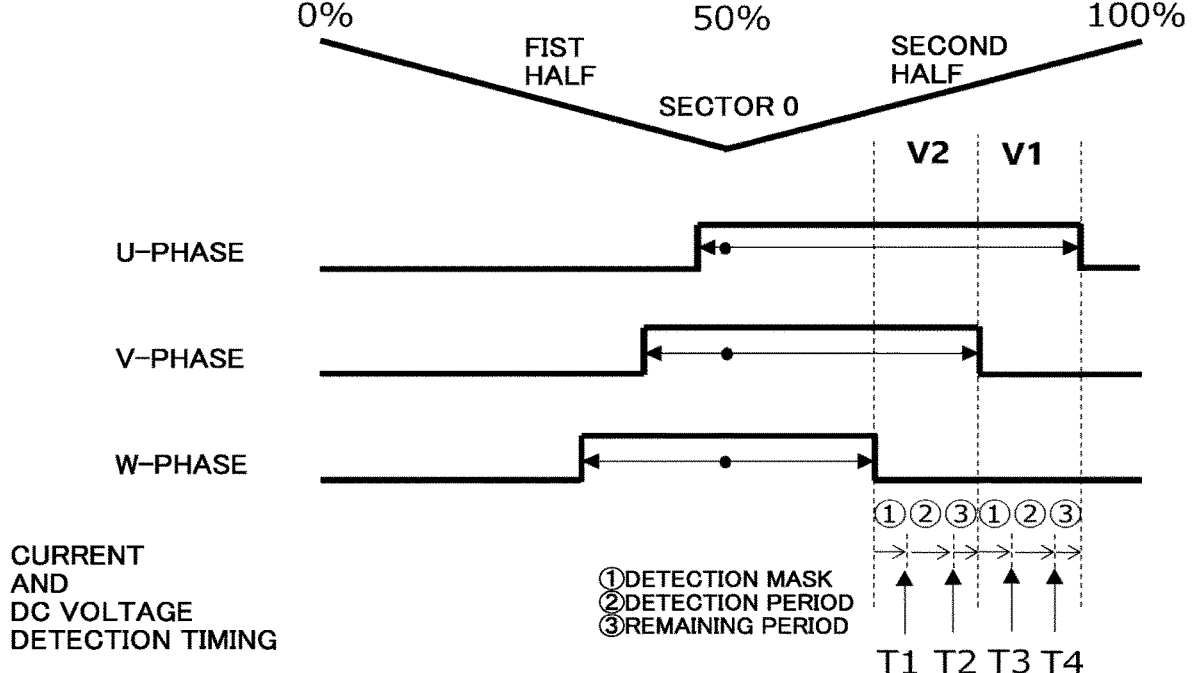
FIG. 25 is a diagram showing current detection timing T1 to T4 in control periods.

The process described hitherto is the process of duty computation in (7). Then, the process same as the process in step S7 is performed (S17), and detection timing T1 to T4 shown in FIG. 24 are set using equation (14) in the process of setting detection timing in (9) (S18).

$$T2 = 50\% +$$
$$\text{duty medium phase (second half of carrier)}/2 - \text{remaining period }\% \quad (14)$$

$$T1 = T2 - \text{detection period }\%$$

$$T4 = 50\% +$$
$$\text{Duty maximum phase (second half of carrier)}/2 - \text{remaining period }\%$$

$$T3 = T4 - \text{detection period }\%$$

The method described hitherto is the phase shift method of the PWM pulses in the same direction, which is added when a single shunt resistor is used. The flowchart processes (7) to (9) for vector control shown in FIGS. 15 and 16 and FIGS. 23 and 24 may be switched alternately for each control period.

Fourth Embodiment

Figure 26:
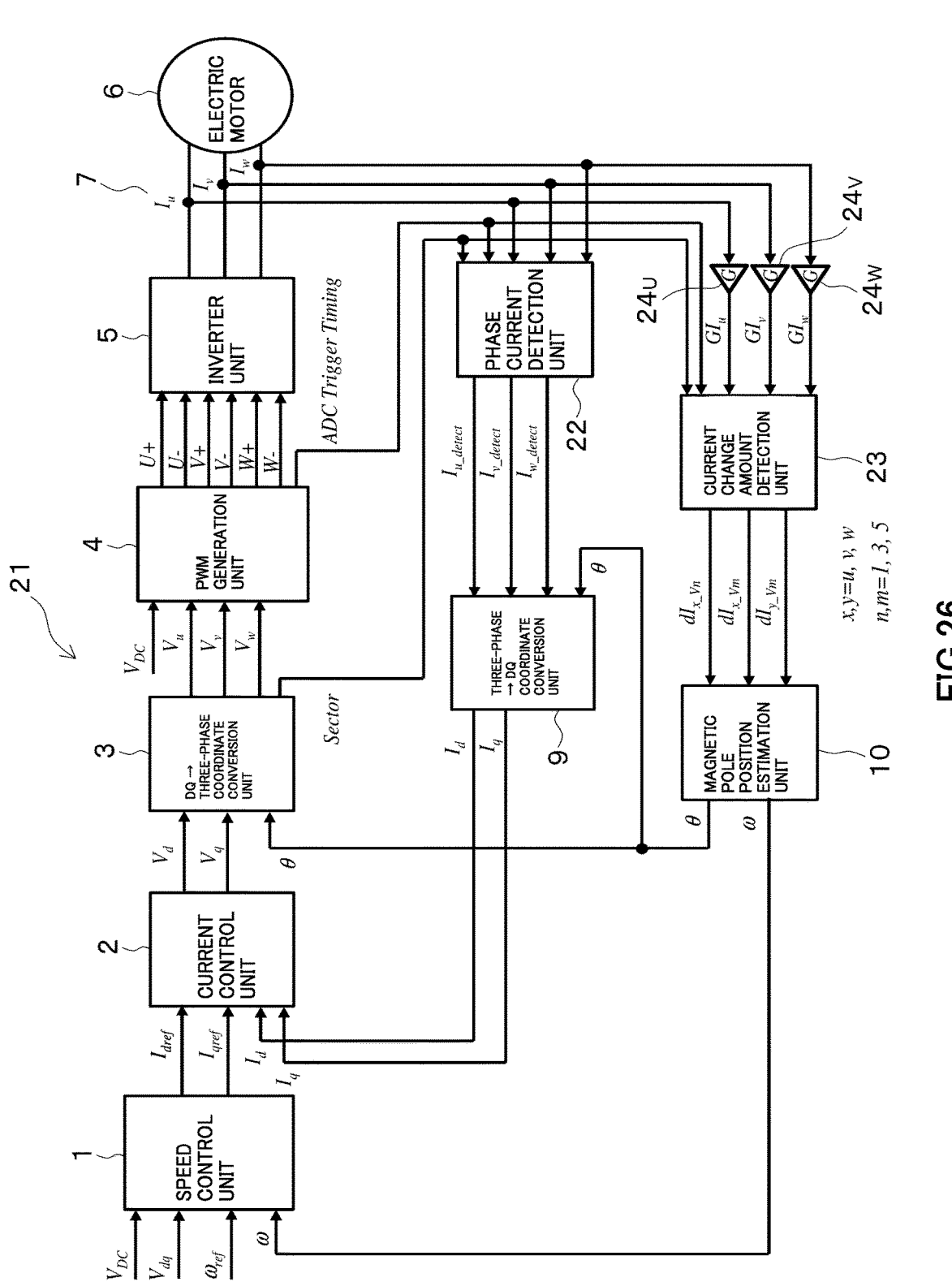
FIG. 26 is a functional block diagram showing the configuration of an electric motor controller of a fourth embodiment.

As shown in FIG. 26, in an electric motor controller 21 in a fourth embodiment, the functional block of the phase current and current change amount detection unit 8 in the electric motor controller 14 in the first embodiment is divided into a phase current detection unit 22 and a current change amount detection unit 23. The current change amount detection unit 23 receives a detection output from the current detector 7 that is amplified by amplifiers 24U, 24V, and 24W. When, for example, the operating power supply voltage is 5 V, the amplifier 24 provides an offset voltage of 2.5 V to achieve gain "2" or the like.

Since the specifications of the current detector 7 are determined in consideration of the maximum output in the entire speed range of the electric motor 6, its resolution decreases when the current detection range is wide and a minute current change amount is detected. Since detection of the magnetic pole position based on the current change amount is mainly used when the electric motor 6 is at low speeds, the detection range of the current change amount may be determined in consideration of the maximum output at the start-up of the electric motor 6 or in the low-speed range. Hence, output signals of the current detector 7 are used, without any processing, as the phase currents of the electric motor 6 for use in vector control. As for the current change amount used for estimating the magnetic pole position, the output signals of the current detector 7 are amplified and used to improve the detection resolution. This makes it easier to estimate the magnetic pole position based on the current change amount, even when the capacity of the system becomes larger and the detection range of the current detector 7 becomes wider.

Although several embodiments of the present invention have been described, the respective embodiments are merely illustrative and are not intended to restrict the scope of the invention. These new embodiments can be performed in other various forms, and various kinds of omissions, replacements and modifications are possible without departing from the meaning of the present invention. These embodiments and their modifications are included in the scope and gist of the invention, as well as in the scope of the invention described in the claims and the equivalents thereof.

We claim:

1. An electric motor controller, comprising:
an inverter circuit that performs on/off control of a plurality of switching elements that are connected by a three-phase bridge, in accordance with predetermined PWM signal patterns, so as to drive an electric motor that converts direct current into a three-phase alternating current;
a current detection element that generates a signal corresponding to a current value of the inverter circuit;
a PWM signal generation unit that generates three-phase PWM signal patterns to follow a magnetic pole position of the electric motor;
a current detection unit that detects phase current of the electric motor based on the signal generated by the current detection element and the PWM signal patterns;
a current change amount detection unit that outputs differences between current values detected twice for each of two phases out of three phases, as current change amounts; and
a magnetic pole position estimation unit that estimates a magnetic pole position of the electric motor based on the current change amounts, wherein
the PWM signal generation unit
uses a triangular wave as a carrier wave,
generates the three-phase PWM signal patterns to allow the current detection unit to detect current of each two phase twice at timing of four points within a carrier wave period of the PWM signal, and
executes a first shift method, in which in the three-phase PWM signals, in magnitude relation of duty ratios of the respective phases that change for each sector of output voltage from the inverter circuit, a maximum phase having a highest duty ratio is shifted in one direction of an advancing side or a delay side with any phase of the carrier wave period as a reference, and an medium phase having an medium duty ratio is shifted in a direction opposite to the maximum phase with the any phase of the carrier wave period as a reference.

2. The electric motor controller according to claim 1, wherein
the PWM signal generation unit generates the PWM signals so that for at least the PWM signal of one phase, out of the three-phase PWM signals shifted by the first shift method, a pulse shift direction of a previous value of the sector is equal to a pulse shift direction of a present value of the sector.

3. The electric motor controller according to claim 1, wherein
the current detection element is connected to a direct current side of the inverter circuit,
the PWM signal generation unit is configured to execute a second shift method, in which in the three-phase PWM signals, in the magnitude relation of duty ratios that change for each sector, the maximum and medium phases are shifted in one direction of the advancing side or the delay side with the any phase of the carrier wave period as a reference, and
the PWM signal generation unit executes the first shift method and the second shift method alternately for each control period.

4. The electric motor controller according to claim 3, wherein in the second shift method, the PWM signal generation unit sets the maximum phase, in the three-phase PWM signals, to be larger in shift amount than the medium phase in the magnitude relation of duty ratios that change for each sector.

5. The electric motor controller according to claim 1, comprising an amplifier that amplifies the signal generated by the current detection element and outputs the signal to the current change amount detection unit.

6. The electric motor controller according to claim 3, comprising an amplifier that amplifies the signal generated by the current detection element and outputs the signal to the current change amount detection unit.

7. The electric motor controller according to claim 2, comprising an amplifier that amplifies the signal generated by the current detection element and outputs the signal to the current change amount detection unit.

8. The electric motor controller according to claim 2, wherein the current detection element is connected to a direct current side of the inverter circuit, the PWM signal generation unit is configured to execute a second shift method, in which in the three-phase PWM signals, in the magnitude relation of duty ratios that change for each sector, the maximum and medium phases are shifted in one direction of the advancing side or the delay side with the any phase of the carrier wave period as a reference, and the PWM signal generation unit executes the first shift method and the second shift method alternately for each control period.

\* \* \* \* \*